(12) United States Patent
Kumar

(10) Patent No.: US 9,094,107 B1
(45) Date of Patent: Jul. 28, 2015

(54) ORTHOGONAL FREQUENCY CHIRP MULTIPLE ACCESSING SYSTEMS AND METHODS

(71) Applicant: Rajendra Kumar, Cerritos, CA (US)

(72) Inventor: Rajendra Kumar, Cerritos, CA (US)

( * ) Notice: Subject to any disclaimer, the term of this patent is extended or adjusted under 35 U.S.C. 154(b) by 0 days.

(21) Appl. No.: 14/244,774

(22) Filed: Apr. 3, 2014

(51) Int. Cl.
| | |
|---|---|
| H04B 1/00 | (2006.01) |
| H04B 1/692 | (2011.01) |
| H04L 27/10 | (2006.01) |
| H04L 27/12 | (2006.01) |
| H04L 27/14 | (2006.01) |
| H04B 1/69 | (2011.01) |

(52) U.S. Cl.
CPC .............. *H04B 1/692* (2013.01); *H04L 27/103* (2013.01); *H04L 27/12* (2013.01); *H04L 27/14* (2013.01); *H04B 2001/6912* (2013.01)

(58) Field of Classification Search
CPC ............. H04B 1/69; H04B 2001/6912; H04B 1/0483; H04B 1/406; H04B 1/692
USPC .......... 375/139, 316, 340, 346, 350; 327/323, 327/324; 455/130, 205, 208
See application file for complete search history.

(56) References Cited

U.S. PATENT DOCUMENTS

| | | | |
|---|---|---|---|
| 5,090,024 A | | 2/1992 | Vander Mey |
| 7,532,676 B2* | | 5/2009 | Fonseka et al. ............... 375/265 |
| 8,520,748 B2* | | 8/2013 | Hamaguchi et al. .......... 375/260 |
| 8,638,890 B2 | | 1/2014 | Kumar |
| 8,767,845 B2* | | 7/2014 | Kumar .......................... 375/260 |
| 2013/0322579 A1 | | 12/2013 | Kumar |
| 2013/0322580 A1 | | 12/2013 | Kumar |
| 2013/0322584 A1 | | 12/2013 | Kumar |

OTHER PUBLICATIONS

R. Kumar and M. Khan, "Mitigation of Multipath Effects in Broadband Wireless Systems using Quantized State Adaptive Equalization method," Proceedings of the IEEE Aerospace Engineering Conference, Mar. 2006, Big Sky, Montana, pp. 1-9.
S. H. Muller and J. B. Huber, "OFDM with reduced peak-to-average power ratio by optimum combination of partial transmit sequences," IEEE Electronic Letters, vol. 33, No. 5, pp. 368-369, Feb. 1997.
P. Van Eetvelt, G. Wade and M. Tomlinson, "Peak to Average Power Reduction for OFDM Schemes by Selective Scrambling," IEE Electronic Letters, vol. 32, No. 21, pp. 1963-1964, Oct. 1996.
H. Ochiai and H. Imai, "MDPSK-OFDM with Highly Power Efficient Block Codes for Frequency-Selective Fading Channels," IEEE Transactions on Vehicular Technology, vol. 49, No. 1, Jan. 2000, pp. 74-82.

(Continued)

*Primary Examiner* — Khai Tran
(74) *Attorney, Agent, or Firm* — Fulwider Patton LLP

(57) ABSTRACT

Various embodiments of the invention are directed to orthogonal frequency chirp multiple accessing (OFCM) systems and methods. For example, various embodiments of the OFCM transmitter may utilize an architecture comprised of a baseband modulation subsystem, a subsystem for generating multiplicity N orthogonal frequency chirp waveforms, and a bank of multiplicity N spread spectrum modulators. Various embodiments of the OFCM receiver may comprise of a subsystem for generating complex conjugates of multiplicity N orthogonal frequency chirp waveforms, a bank of multiplicity N spread spectrum demodulators, a symbol estimator, a symbol timing estimator, a frequency offset estimator, a carrier phase tracking loop, a multi channel estimator, and a baseband demodulation subsystem.

21 Claims, 16 Drawing Sheets

(56) References Cited

OTHER PUBLICATIONS

Sang-Woo Kim, Jin-Kook Chung, Heung-Gyoon Ryu, "PAPR Reduction of the OFDM Signal by the SLM-based WHT and DSI Method", 2006 IEEE Tencon, pp. 1-4, Nov. 2006.

R.van Nee and A. de Wild, "Reducing the Peak-To-Average Power Ratio of OFDM", Vehicular Technology Conference, 1998. VTC98. 48th IEEE, vol. 3, pp. 2072-2076, May 1998.

T.M. Schmidl and D.C. Cox, "Robust Frequency and Timing Synchronization for OFDM," IEEE Transactions on Communications, vol. 45, No. 12, pp. 1613-1621, Dec. 1997.

H. Minn, V.K. Bhargava, and K.B. Lataief, "A Robust Timing and Synchronization for OFDM System," IEEE Transactions on Wireless Communications, vol. 2, No. 4, pp. 822-839, Jul. 2003.

S. Ohno, E. Manasseh, and M. Nakamoto, "Preamble and Pilot Symbol Design for Channel Estimation in OFDM Systems with Null Subcarriers," EURASP Journal on Wireless Communication and Networking, 2011-2, pp. 1-17.

R. Kumar and W. J. Hurd, "A Class of Optimum Digital Phase Locked Loops for the DSN Advanced Receiver," TDA Progress Report 42-83, Jul.-Sep. 1985, pp. 63-80, Jet Propulsion Laboratory, California Institute of Technology.

P. Flandrin, "Time-Frequency and Chirps," http://www.ens-lyon.fr/~flandrin/.

R. Kumar, "Analysis of FM Demodulator Output Noise with Applications to the Space Lift Range System," 2006 IEEE Aerospace Conference, 0-7803-9546-08/06, 2006.

R. Kumar, "Analysis of FM Demodulator Output Noise with Applications to FM Telemetry," Journal of Applied Mathematics and Decision Sciences, vol. 2006, Article ID 53649, pp. 1-13, Hindawi Publishing Corporation, 2006.

R. Kumar, Multi Transform OFDM Systems and Methods with Low Peak to Average Power Ratio Signals, U.S. Appl. No. 13/913,761, filed Jun. 10, 2013.

\* cited by examiner

ORTHOGONAL FREQUENCY CHIRP MULTIPLE ACCESSING SYSTEMS AND METHODS

BACKGROUND

Broadband wireless systems are in a rapidly evolutionary phase in terms of the development of various technologies, development of various applications, deployment of various services and generation of many important standards in the field. Although there are many factors to be considered in the design of these systems, the key factors have been the bandwidth utilization efficiency due to the limited bandwidth allocation, flexibility in operation and robustness of the communication link in the presence of various disturbances while achieving the specified performance. At present, the OFDM techniques have been adapted in many wireless communication standards, such as the World-wide Interoperability for Microwave ACCESS (Wimax), digital audio broadcasting (DAB), digital video broadcasting-terrestrial (DVB-T), Long Term Evolution (LTE), etc.

One of the advantages of the OFDM system is the mitigation of a major source of distortion present in high data rate wireless communication links, namely the inter symbol interference (ISI) achieved by reducing the symbol period by the use of multiple carrier transmission. However, the use of a large number of carriers based on the orthogonality property in the OFDM system makes the performance of the system very sensitive to any carrier frequency offsets introduced, for example, by the Doppler shifts encountered in the wireless channels. The proper operation of the OFDM system requires means for precise estimate of the Doppler that may be different for different carriers in the frequency selective fading channel, and means to mitigate such a Doppler effect from the received OFDM signal. Various methods exist in the prior art to solve this problem.

Another important problem arising with the use of a relatively large number N of carriers used in the OFDM signal is a relatively high peak to average power ratio resulting in a much reduced radio frequency (RF) power amplifier efficiency. Due to the inherent saturation in the RF power amplifier, the signal with amplitude exceeding the input linear range of the amplifier is clipped or distorted. In order to keep the distortion to some specified limit arrived at by the signal to distortion plus noise power ratio considerations, the output RF power is backed off from the maximum available power at the amplifier output and higher is the peak to average power ratio of the signal at the amplifier input, larger is the required back off in the output power. The output back off concurrently also results in the reduction of the DC to RF power conversion efficiency of the RF power amplifier thus increasing the drain on the battery or any other power supply source in the mobile devices. Another problem arising due to distortion caused by the amplifier is the spreading of the spectrum of the OFDM signal outside the allocated band.

Various methods exist in the prior art to solve the problem of high peak to average power ratio including the method taught by Kumar in, "Multi Transform OFDM Systems and Methods with Low Peak to Average Power Ratio Signals," U.S. patent application Ser. No. 13/913,761. The simulation results with the Multi Transform OFDM Systems show that the system effectively eliminates any increase in the peak to average power ratio of the OFDM signal due to a relatively large number of carriers.

However, in the multiple accessing mode of the OFDM system wherein relatively narrow band OFDM channels are assigned to various users in a mobile communication network, the frequency selective fading of the communication channel may cause severe fading of some of the user signals resulting in frequent hand offs or call drops for such users in a mobile communication network. The solution to such a problem may be the transmission of the user signal over multiple OFDM channels for providing a diversity gain and/or transmission at a much reduced data rate. However, such a solution results in a reduced capacity of the OFDM system.

Another problem with the OFDM system is that the narrow band signals of various users have no protection against any intended or unintended interference. Any significant narrowband interference in any of the OFDM channels may disrupt communication to users assigned such channels.

Band limiting filters such as square root raised cosine filters are used in the OFDM systems to minimize the transmission bandwidth. Due to band limiting filtering effects a significant number of OFDM channels at the band edges are not assigned to any users as the edge channels are subjected to significant attenuation resulting in a significant reduction of the OFDM system capacity.

There is a strong motivation to come up with systems and methods that achieve higher bandwidth efficiency compared to the OFDM system by eliminating the edge channel effects of the OFDM system, and provide protection against deep fades in some segments of the spectrum and against narrowband interference.

The orthogonal frequency chirp multiple accessing (OFCM) system of the invention is a spread spectrum system wherein each user spectrum occupies the complete wide band of the OFCM system, thereby providing protection against both the interference and frequency selective fading. Deep fading in a few segments of the wide band spectrum may not result in any significant performance degradation to any of the users. The prior art frequency chirp method used in Radar and other systems is comprised of the transmission of a single frequency chirp signal. The OFCM system of the invention is for the transmission of multiple user signals over the same transmission band in a mutually non interfering manner.

The OFCM system of the invention requires approximately the same bandwidth as that for the OFDM system, however, it does not have any edge effects of the OFDM system wherein a significant part of the transmission band is not used for information transmission, as in the OFDM system the edge OFDM channels suffer from a disproportionate amount of attenuation due to the band limiting effects. In the OFCM system of the invention, each user's transmission is over the complete wide band of the OFCM system and any filtering effects may result in only a relatively minor degradation of performance for the users, thereby solving the problem of edge effects. In prior art the frequency chirp method used in the Radar and other systems is comprised of transmission of a single frequency chirp signal. The OFCM systems of the invention are for the transmission of multiple user signals in the same transmission band in a mutually non interfering manner.

In the OCFM system of the invention, individual user signals with modulations such as MPSK (Multi Frequency Shift Keying), are constant envelope signals inheriting the property from the frequency modulated (FM) signals with an advantage in terms of requiring relatively low amplifier back off in the user to base station transmission in a mobile communication network wherein the power efficiency is relatively more important. The OFCM system of the invention inherits advantages of both the OFDM system and the spread spectrum systems such as relatively high bandwidth efficiency of the OFDM system, and the protection against frequency selective fading and narrow band interference offered by the spread spectrum systems. These and other advantages of the OFCM system will be apparent from the detailed description of the invention.

SUMMARY OF THE INVENTION

Various embodiments of the invention are directed to methods and systems for orthogonal frequency chirp multiple accessing (OFCM) transmitters and receivers for communication over wireless fading channels. For example, various embodiments of the transmitter may utilize an architecture comprised of a baseband modulation subsystem for receiving and modulating the input data providing the multiplicity $N_u$, in general complex valued, information baseband symbols, a subsystem for generating multiplicity $N_T$ frequency chirp waveforms, a bank of multiplicity $N_T$ spread spectrum modulators modulating the frequency chirp waveforms by the information baseband symbols for providing multiplicity $N_T$ spread spectrum signals, and an adder summing the spread spectrum signals for providing the serial OCFM signal comprised of the consecutive OCFM symbols.

Various embodiments of the OFCM) transmitter of the invention may be further comprised of a guard interval insertion unit for cyclically extending the OCFM symbol duration $T_0$ by a guard interval $T_G$ providing the extended OFCM symbol of the baseband OCFM signal, a baseband to IF converter modulating the baseband OCFM signal by the IF local oscillator in phase and quadrature signals for providing the IF band pass OCFM signal, and an RF stages unit comprised of an up converter, an RF band pass filter and power amplifier for providing the RF band pass OCFM signal.

In various embodiments of the invention, the subsystem for generating multiplicity $N_T$ frequency chirp waveforms may be further comprised of a periodic saw tooth waveform generator, a tapped delay line of length N-1 providing a multiplicity N delayed versions of the periodic saw tooth waveform and a bank of $N_T$ complex baseband FM (frequency modulation) modulators inputted by the $N_T \leq N$ selected delayed versions of the periodic saw tooth waveform, wherein the multiplicity $N_T$, complex baseband, frequency chirp waveforms at the outputs of the modulators are nearly orthogonal over the symbol period of the information baseband symbols.

In various alternative embodiments of the invention, the subsystem for generating multiplicity $N_T$ frequency chirp waveforms may be further comprised of a digital waveform generator for providing a periodic digital waveform $h_0(k)$ with k denoting discrete time, a digital phase modulator for phase modulation of the periodic digital waveform providing the phase modulated output $\exp(j\pi h_0(k))$, $j=\sqrt{-1}$ to a digital tapped delay line of length N-1 wherein the N outputs of the digital tapped delay line are discrete time orthogonal waveforms over the symbol period of the information baseband symbols. The subsystem for generating multiplicity $N_T$ frequency chirp waveforms may further be comprised of adjusting the $n^{th}$ discrete time orthogonal waveforms by a constant phase $\phi_n$; n=0, 1, . . . , N-1 such that the multiplicity N phase adjusted waveforms have their phase equal to 0 at the beginning of each OFCM symbol period, and the selection of $N_T \leq N$ phase adjusted discrete time orthogonal waveforms.

Various embodiments of the baseband modulation subsystem may be comprised of multiplicity $N_u \leq N_T$ baseband modulators for receiving and modulating the input data comprised of the multiplicity $N_u$ users' input data for providing the multiplicity $N_u$, in general complex valued, information baseband symbols. In various alternative embodiments the baseband modulation subsystem may be comprised of a baseband modulator and a serial to parallel converter for providing the multiplicity $N_u$, in general complex valued, information baseband symbols. In various embodiments the baseband modulator may be one out of the group comprised of the MQAM modulator and the MPSK modulator, or any more general modulator architecture. The baseband modulator may also be comprised of error correction encoders and interleavers.

In various embodiments of the OFCM transmitter an information baseband symbol may be modulated by multiple frequency chirp waveforms for providing a diversity gain over that inherent in the frequency chirp modulation system. In various embodiments of the OFCM transmitter an information baseband symbol may be modulated by multiple frequency chirp waveforms in a multicast session.

Various embodiments of the OFCM receiver of the invention may utilize an architecture comprised of a receive antenna for receiving the RF band pass OCFM signal, an RF front stage unit comprised of an RF filter, amplifier and down converter for providing the IF band pass OCFM signal, a cascade of an IF to complex baseband converter, an analog to digital converter, and a guard interval deletion unit for providing the baseband OFCM signal, a frequency chirp waveform generator for providing the complex conjugates of the $N_R$ frequency chirp waveforms selected from the multiplicity N phase adjusted discrete time orthogonal waveforms, a bank of multiplicity $N_R$ spread spectrum demodulators, a symbol estimator for providing linear estimates of the multiplicity $N_R$ information baseband symbols, a bank of multiplicity $N_u \leq N_R$ decision devices for the detection of the information baseband symbols, and a baseband demodulation subsystem for providing the estimate of the input data. In various embodiments of the OFCM receiver multiple linear estimates of the information baseband symbols may be combined before being inputted to a decision device wherein the multiple linear estimates correspond to the same transmitted information baseband symbol for the purpose of providing the diversity gain.

Various embodiments of the OFCM receiver of the invention may further be comprised of a symbol timing estimator, a frequency offset estimator, and a carrier phase tracking loop. The symbol timing estimator providing the OFCM timing of the received serial OFCM signal may be based on the relatively high correlation between the signal segments during the initial and end intervals of duration $T_G$ of the extended OFCM symbol period. The frequency offset estimate may be obtained in terms of the argument of the said complex valued correlation computed using the estimated OFCM symbol timing.

Various embodiments of the carrier phase tracking loop may be comprised of a bank of multiplicity $N_c$ phase detector units for providing the estimates of the carrier phase error, wherein $N_c$ is an integer from the range of integers 1 to $N_R$, a cascade of a phase error averaging unit, a gain block and a loop filter for providing the phase correction signal, and an NCO (numerically controlled oscillator) for providing the phase corrected IF in phase and quadrature local oscillator signals to the IF to complex baseband converter unit of the OFCM receiver.

In various embodiments of the invention wherein the OFCM receiver is located, for example, at the base station of a mobile communication network, the carrier phase of the OFCM signals transmitted from different mobile user terminals may be all different and may need to be tracked separately. The carrier phase tracking loop in such embodiments of the OFCM receiver may be comprised of a phase corrector for correcting the carrier phase error incurred in the linear estimates of the information baseband symbols for providing the phase error corrected information baseband symbols, a decision device for the detection of the information baseband symbols, a cascade of a phase error detector, a gain block, and a loop filter for providing an estimate of the residual carrier phase error, a phase modulator for providing the complex exponential function of the loop filter output to the phase corrector.

In various embodiments of the OFCM receiver of the invention wherein the communication channel either exhibits non frequency selective fading characteristics or does not exhibit any fading, the symbol estimator unit may be comprised of a bank of multiplicity $N_R$ integrate and dump matched filters.

In various embodiments of the OFCM receiver of the invention wherein the communication channel exhibits frequency selective fading characteristics, the symbol estimator unit may be comprised of a matched filter block, a channel estimator, an equalizer, and a vector to serial converter wherein the channel estimator and the equalizer are connected in a back to back manner. The channel estimator unit provides an estimate of the channel frequency response vector of the frequency selective fading channel based on, for example, an exponentially data weighted least squares algorithm. The channel estimator unit may be further comprised of a first loop comprised of an adder, a delay, and a λ-multiplier for generating a vector $\chi$, a matrix $S_M$ generator for providing the matrix $S_M$ with elements derived from the linear symbol estimates, a second loop for accumulating the matrix $(S_M S_M^H)$, H denotes Hermitian transpose, with exponential data weighting for providing a matrix P, and a matrix inverter and a matrix multiplier for computing the estimate of the channel frequency response vector from the matrix P and the vector $\chi$.

In various embodiments, the equalizer may be comprised of a transfer matrix Q generator for generating the matrix Q with elements derived from the elements of the estimate of the channel frequency response vector and the elements of the Fourier transform matrix, and a least squares estimator for providing the linear estimate of the symbol vector.

In various embodiments of the invention wherein the RF OFCM signals from multiple OFCM transmitters are received over multiplicity $N_R$ communication channels with frequency selective fading characteristics, the symbol estimator unit of the OFCM receiver may be comprised of a matched filter block, an equalizer, a vector to serial converter, a multichannel channel estimator for providing the channel matrix C with columns composed of the estimates of the channel frequency response vectors of multiplicity $N_R$ channels, and a splitter for providing the estimates of the channel frequency response vectors to the matched filter block. In various embodiments, the multichannel channel estimator may be comprised of an exponentially weighted Kalman filter for the estimation of the channel matrix C.

BRIEF DESCRIPTION OF THE DRAWINGS

Various embodiments of the present invention are described here by way of examples in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for orthogonal frequency chirp multiple accessing (OFCM) communication systems and methods.

Figure 1:
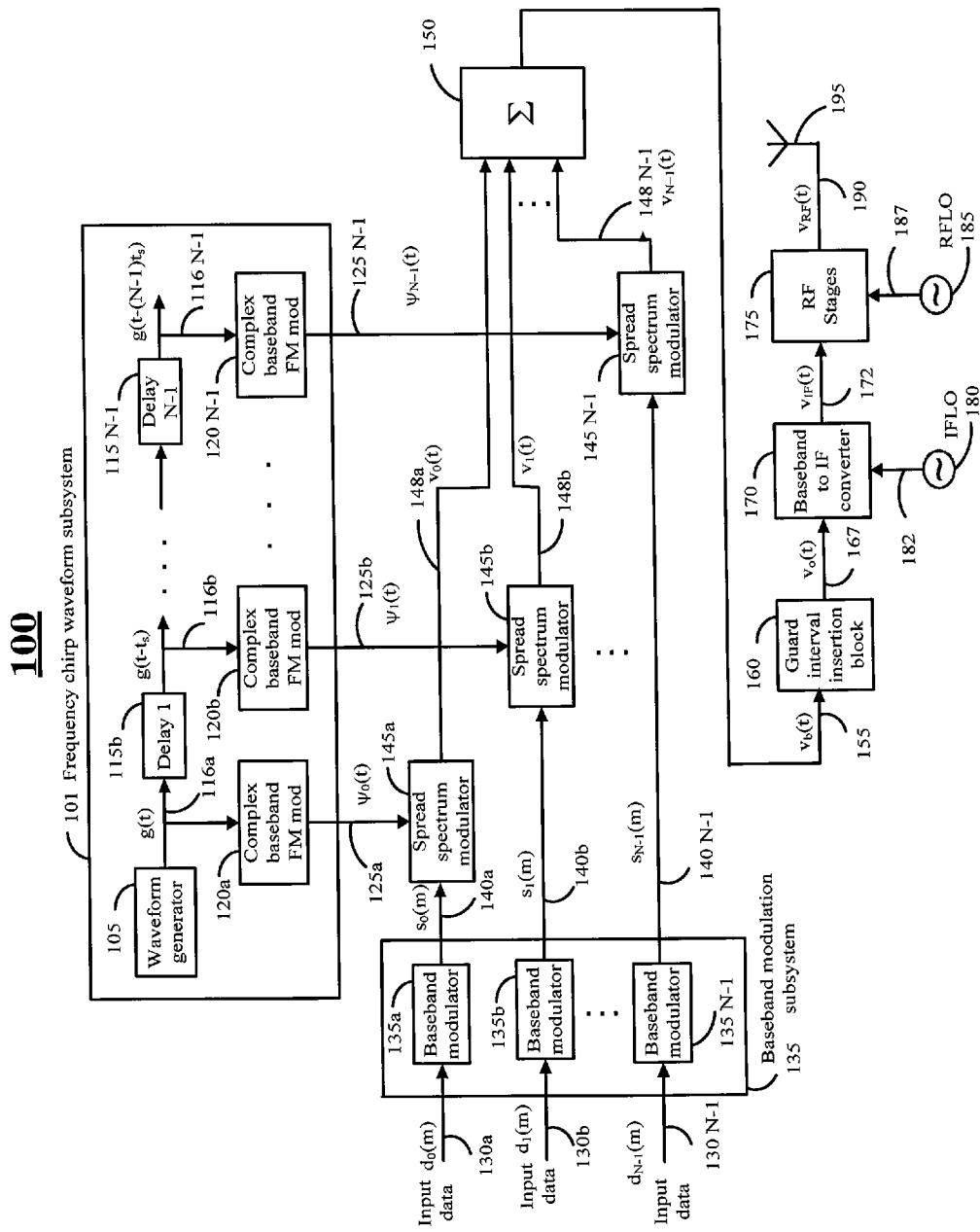
FIG. 1 shows a block diagram of one embodiment of OFCM transmitter.

FIG. 1 shows the block diagram of one of the various embodiments of the invention. Referring to the OFCM (Orthogonal Frequency Chirp Multiple Accessing) system transmitter 100 block diagram in FIG. 1, the input data comprised of N users' input data is inputted to the baseband modulation subsystem 135. Referring to FIG. 1, the $n^{th}$ user input data 130n $d_n(m)$ is inputted to the baseband modulator 135n for n=0, 1, . . . , N-1. The data $d_n(m)$ may be binary valued taking values 0 and 1, wherein m denotes the discrete time. In various embodiments of the invention, the transmitter may be located at the base station of a mobile network and the data $d_n(m)$ may be destined for the mobile user n receiver. In various other embodiments of the invention, the transmitter may be part of the mobile user equipment with the $N_u \leq N$ data streams destined to the same base station, wherein the $N_u$ data streams may be generated by splitting a single data stream d(m) into N data streams $d_n(m)$ by a serial to parallel converter, not shown in FIG. 1. In various other embodiments of the invention, the serial to parallel converter may split the output of a single baseband modulator inputted by the user data d(m). Throughout this application, the notation a, b, . . . , N-1 denotes the enumeration from 0 to N-1 for any positive integer N.

The baseband modulator 135n segments the user input data 130n $d_n(m)$ into groups of $m$ binary valued data bits and maps each of the groups of the $m$ binary data bits into one of the M=2$m$, in general complex valued, information baseband symbols 140n $s_n(m)$ with $m$ selected equal to an integer greater than or equal to 1. The one to one mapping of the groups of $m$ binary valued data bits into the corresponding information baseband symbol may be based on any of the baseband modulation techniques, selected, for example, from the set of the MQAM (M'ary Quadrature Amplitude Modulation), the MPSK (M'ary Phase Shift Keying), and the MASK (M'ary Amplitude Shift Keying) modulation techniques. In various embodiments of the invention, the baseband modulator may also be comprised of an error correction code encoder and an interleaver.

Referring to FIG. 1, the frequency chirp waveform subsystem 101 generates the multiplicity N frequency chirp waveforms 125 $\psi_0(t), \psi_1(t), \ldots, \psi_{N-1}(t)$. In various embodiments of the invention the number of frequency chirp waveforms N may be different than the number of users' input data N. For example, in various embodiments of the invention the output of one of the baseband modulators 135n may be modulated by multiple frequency chirp waveforms.

Figure 1A:
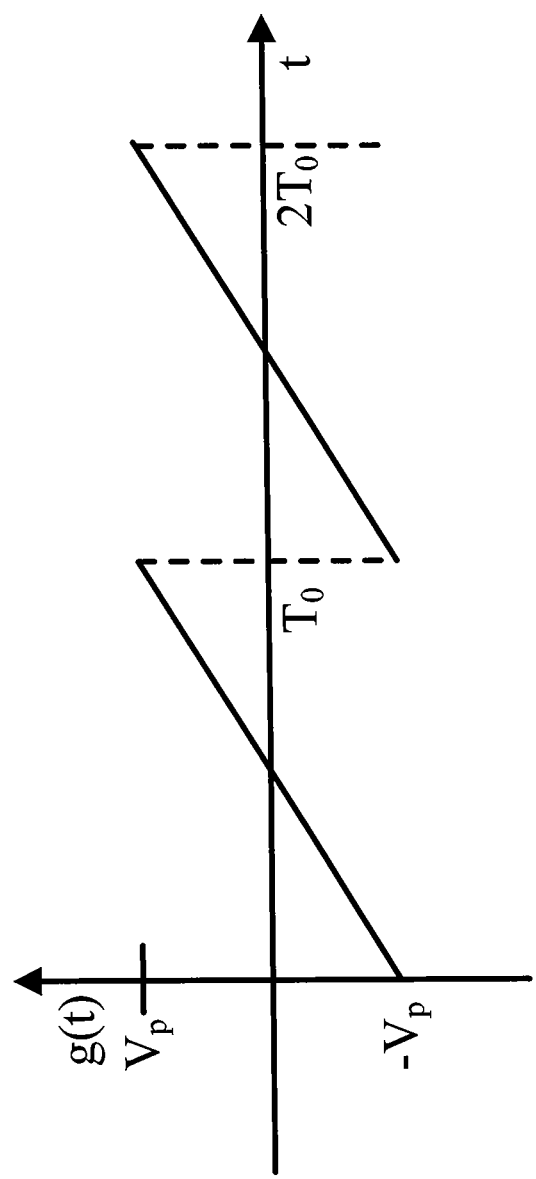
FIG. 1A shows a plot of a periodic saw tooth waveform.

Referring to FIG. 1, the waveform generator 105 generates a periodic saw tooth waveform 116a g(t) of period $T_0$ and amplitude Vp shown in FIG. 1A. The waveform g(t) is inputted to a tapped delay line 115 providing the N-1 delayed versions of g(t) with the $n^{th}$ delayed version 116n g(t-nt$_s$); n=1, 2, ..., N-1 wherein $t_s=T_0/N$. Referring to FIG. 1, the waveform g(t) and various delayed versions g(t-nt$_s$) 116a through 116 N-1 are inputted to the respective complex baseband FM modulators 120a through 120 N-1. The complex baseband FM modulator 120n frequency modulates the input signal 116n g(t-nt$_s$) providing the frequency chirp waveform 125n $\psi_n(t)$ at the output for n=0, 1, ..., N-1. The frequency chirp waveform 125n $\psi_n(t)$ is given by $$\psi_n(t) = \exp\left[jD_f \int_{-\infty}^{t} g_n(\tau) d\tau\right]; g_n(t) \equiv g(t-nt_s); j = \sqrt{-1} \quad (1)$$

where $D_f$ in (1) denotes the frequency modulator sensitivity and $$g(t) = \left(2\frac{t}{T_0} - 1\right)V_p \quad (2a)$$

$$\int_{(i-1)T_0}^{iT_0} g_n(t) dt = 0; \text{ for any integer } i \quad (2b)$$

From (1) and (2) it follows that $\psi_n(t)$ is a periodic waveform of period $T_0$ with $$\psi_n(t) = \exp\left[jD_f \int_0^t g_n(\tau) d\tau\right]; 0 \leq t < T_0 \quad (3)$$

The instantaneous frequency deviation is given by $$f_{d,n} = \frac{D_f}{2\pi} g_n(t) \quad (4a)$$

with the peak frequency deviation given by $$F_m = \frac{D_f V_p}{2\pi} \quad (4b)$$

The frequency chirp waveform 125n $\psi_n(t)$ may be expressed in terms of the frequency deviation $f_{d,n}(t)$ as $$\psi_n(t) = \exp[j\varphi_n(t)]; \quad (5a)$$

$$\varphi_n(t) = 2\pi \int_0^t f_{d,n}(\tau) d\tau; \varphi_0(t) = 2\pi F_m \int_0^t \left(2\frac{\tau}{T_0} - 1\right) d\tau; 0 \leq t < T_0 \quad (5b)$$

From (1)-(5), the cross correlation between any pair of waveforms 125n $\psi_n(t)$ and 125m $\psi_m(t)$ may be evaluated as $$\int_0^{T_0} \psi_n(t)\psi_m^*(t) dt = \int_0^{T_0} \exp\left[j2\pi \int_0^t (f_{d,n}(\tau) - f_{d,m}(\tau)) d\tau\right] dt \quad (6)$$

Figure 1B:
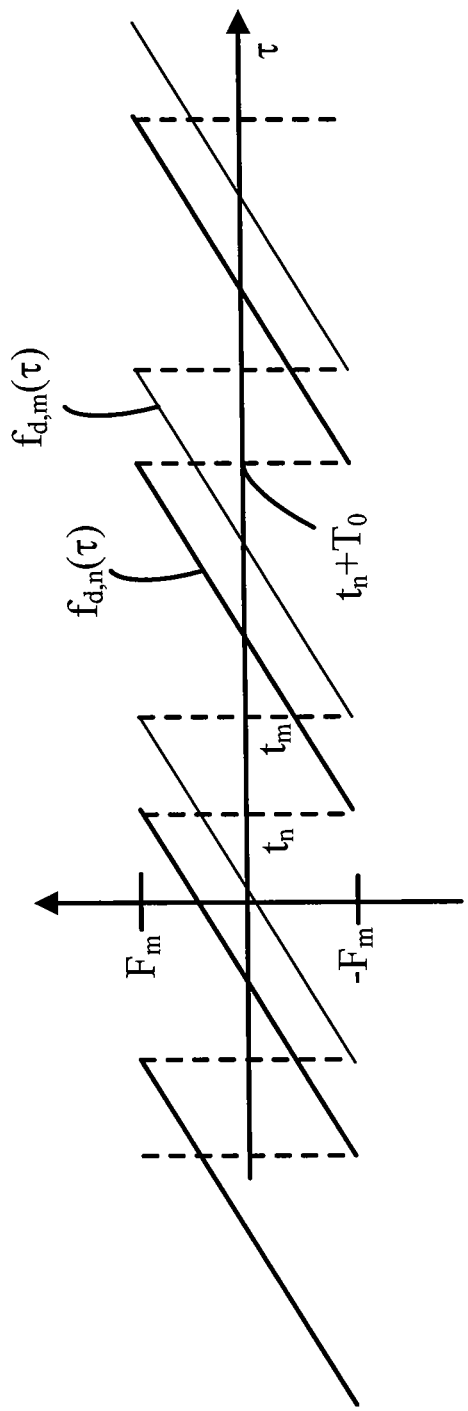
FIG. 1B shows plots of instantaneous frequency deviation of two frequency chirp waveforms.
Figure 1C:
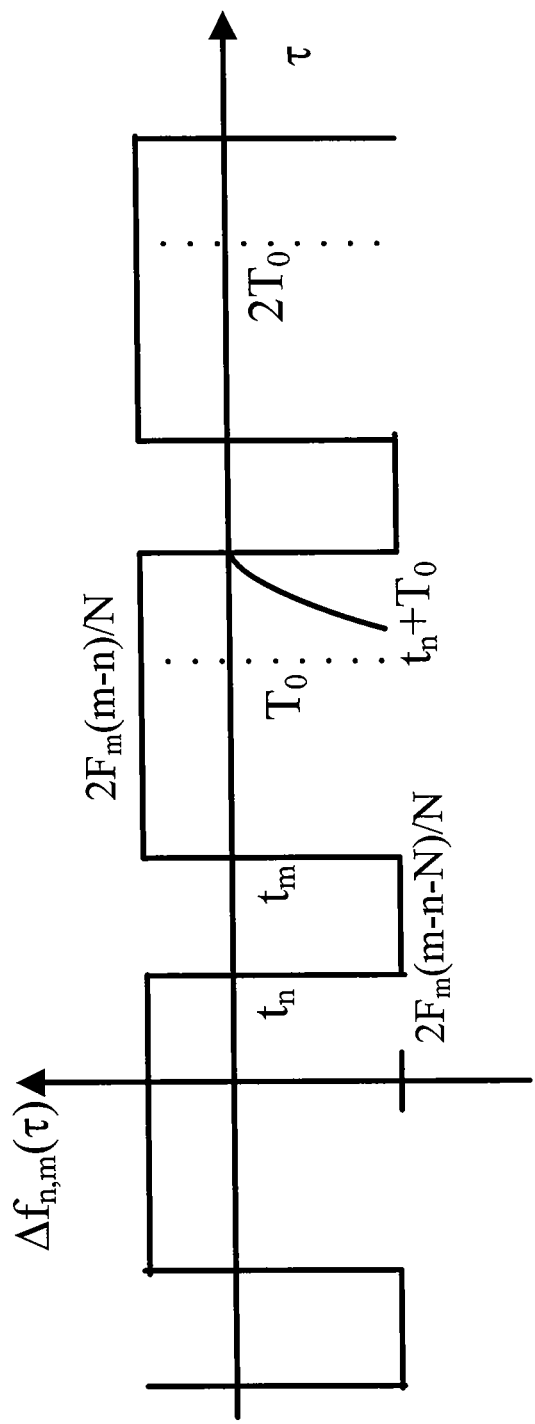
FIG. 1C shows a plot of the difference between instantaneous frequency deviations of two frequency chirp waveforms.

FIG. 1B plots the waveforms $f_{d,n}(\tau)$ and $f_{d,m}(\tau)$ for the case of m>n with $t_n=nt_s$ and $t_m=mt_s$ with FIG. 1C showing the plot of the function $\Delta f_{n,m}(\tau)=(f_{d,n}(\tau)-f_{d,m}(\tau))$. From FIG. 1C, the function $\Delta f_{n,m}(\tau)$ is given by $$\Delta f_{n,m}(\tau) = \begin{cases} 2F_m(m-n)/N; 0 \leq \tau < nt_s; mt_s \leq \tau < T_0 \\ [2F_m(m-n)/N - 2F_m]; nt_s \leq \tau < mt_s \end{cases} \quad (7)$$

Integration of $\Delta f_{n,m}(\tau)$ and with the substitution of $(2F_m t_s)=1$ results in $$\int_0^t \Delta f_{n,m}(\tau) d\tau = \quad (8)$$

$$\begin{cases} 2F_m \frac{(m-n)}{N} t; 0 \leq t < nt_s \\ 2F_m\left[\frac{(m-n)}{N} - 1\right](t-nt_s) + \frac{(m-n)}{N}n; nt_s \leq t < mt_s \\ 2F_m \frac{(m-n)}{N}(t-mt_s) + \frac{(m-n)(m-N)}{N}; mt_s \leq t < T_0 \end{cases}$$

Substitution of (8) in the right hand side of (6) and integration with respect to t yields $$\frac{1}{T_0}\int_0^{T_0} \psi_n(t)\psi_m^*(t) dt = \frac{-1}{4\pi F_m T_0}\left[\frac{(m-n)}{N}\left\{1 - \frac{(m-n)}{N}\right\}\right]^{-1} \times \quad (9)$$

$$\left\{\exp\left[j2\pi\frac{(m-n)m}{N}\right] - \exp\left[j2\pi\frac{(m-n)n}{N}\right]\right\}$$

For the case of n=m, equation (6) results in $$\frac{1}{T_0}\int_0^{T_0} \psi_n(t)\psi_n^*(t) dt = 1; n = 0, 1, \ldots, N-1 \quad (10)$$

The use of a trigonometric identity in (9) results in the equivalent expression for the correlation coefficient $\rho_{n,m}$ in (10).

$$\rho_{n,m} \equiv \frac{1}{T_0}\int_0^{T_0} \psi_n(t)\psi_m^*(t) dt = \quad (11)$$

$$-j\frac{(m-n)}{N}\left[1 - \frac{(m-n)}{N}\right]^{-1} \frac{\sin[\pi(m-n)^2/N]}{\pi(m-n)^2/N} \times \exp[j\pi(m^2-n^2)/N]$$

Figure 1D:
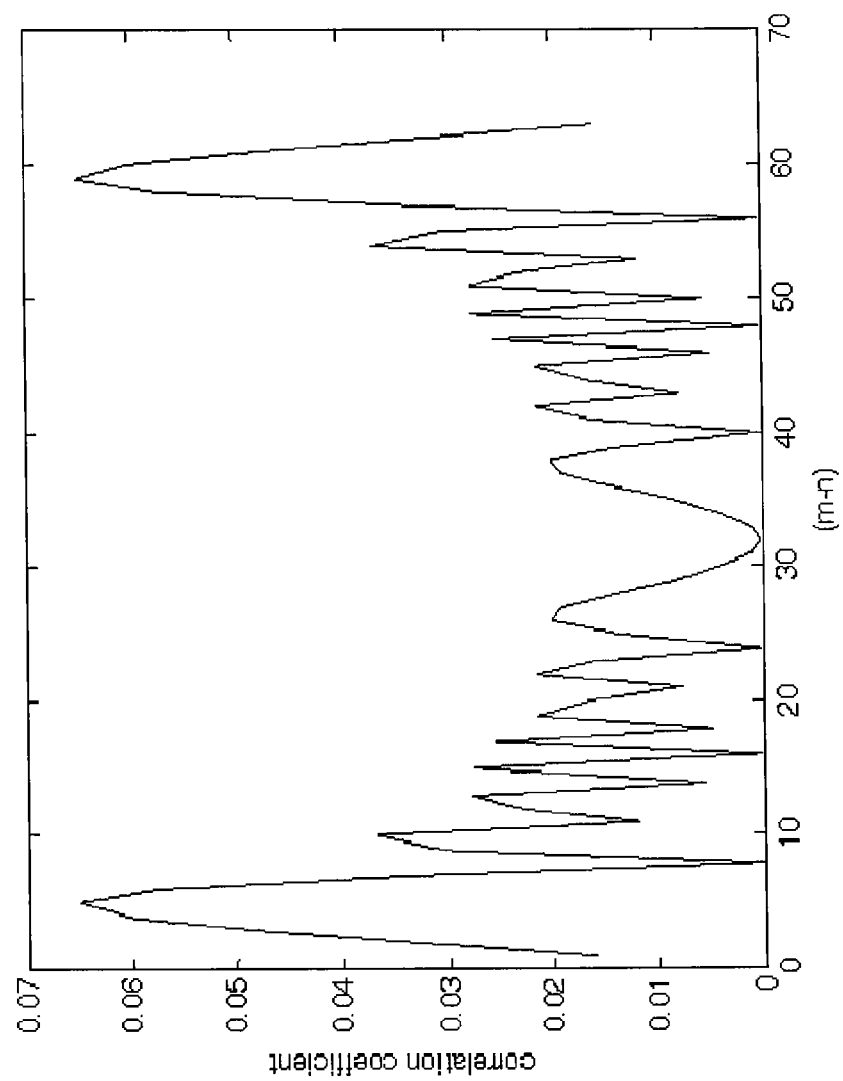
FIG. 1D shows plot of the correlation coefficient between two continuous time frequency chirp waveforms.

FIG. 1D plots the magnitude of $\rho_{n,m}$ versus (m-n) for the example case of N=64 obtained from (11) and given by (12).

$$|\rho_{n,m}| = \frac{(m-n)}{N}\left[1 - \frac{(m-n)}{N}\right]^{-1}\left|\frac{\sin[\pi(m-n)^2/N]}{\pi(m-n)^2/N}\right| \quad (12)$$

FIG. 1D shows that the magnitude of $\rho_{n,m}$ is relatively small for all nonzero values of (m-n) with the mean value equal to 0.021. The frequency chirp waveforms $\psi_n(t)$; n=0, 1, . . . , N-1 are nearly orthogonal over the interval $T_0$ with each of the N waveforms occupying the same spectral bandwidth of about $2F_m$ and constitute a set of nearly orthogonal spread spectrum waveforms. From (1)-(3), the waveforms $\psi_n(t)$; n=0, 1, . . . , N-1 are periodic with period $T_0$.

Referring to FIG. 1, the information baseband symbols 140n $s_n(m)$ with a symbol rate of $R_s = 1/T_0$ sps (symbols per second) are inputted to the spread spectrum modulator 145n for n=0, 1, . . . , N-1. The spread spectrum modulator 145n is provided with the frequency chirp waveform 125n $\psi_n(t)$ that modulates the information baseband symbol sequence 140n $s_n(m)$ providing the spread spectrum signal 148n $v_n(t)$ at the output given by $$v_n(t) = s_n(m)\psi_n(t); (m-1)T_0 \le t < mT_0; n=0,1,\ldots,N-1; \\ m=1,2,\ldots \quad (13)$$

The spread spectrum signal 148n $v_n(t)$ has a two-sided bandwidth of $2(F_m + B_g + R_s)$ from the Carson's rule for the FM signal bandwidth wherein $B_g$ is the bandwidth of the periodic waveform g(t). With $2F_m = NR_s$, the two-sided bandwidth of the signal 148n $v_n(t)$ may be conservatively estimated by $(N+8)R_s$ that is nearly equal to $NR_s$ for N>>1.

Referring to FIG. 1, the N spread spectrum signals 148n $v_n(t)$ are inputted to the adder 150 for providing the serial OFCM (Orthogonal Frequency Chirp Multiple Accessing) Signal 155 $v_b(t)$ at the output with $$v_b(t) = \sum_{n=0}^{N-1} v_n(t) = \sum_{n=0}^{N-1} s_n(m)\psi_n(t); (m-1)T_0 \le t < mT_0 \quad (14)$$

Referring to FIG. 1, the baseband OFCM signal 155 $v_b(t)$ is inputted to the guard interval insertion block 160 that introduces a guard band of $T_G$ seconds before each of the OFCM symbols, comprised of the consecutive $T_0$ second segments of the OFCM signal 155 $v_b(t)$, to protect against multipath distortion, by the cyclic extension of the serial OFCM signal 155 $v_b(t)$ generating the baseband OFCM signal 167 $v_o(t)$ given by (15) wherein $T_{0e} = T_0 + T_G$ is the extended OFCM symbol period with the effective symbol rate $R_{se} = 1/T_{0e}$.

$$v_o(t) = \begin{cases} \sum_{n=0}^{N-1} s_n(m)\exp\left[jD_f\left\{\int_0^{t-(m-1)T_{0e}} g_n(\tau)d\tau\right\}\right]; \\ (m-1)T_{0e} \le t < mT_{0e} - T_G \\ v_o(t+T_0); (m-1)T_{0e} - T_G \le t < (m-1)T_{0e} \end{cases} \quad (15)$$

Referring to FIG. 1, the baseband OFCM signal 167 $v_o(t)$ is inputted to the baseband to IF converter that modulates the signal 167 $v_o(t)$ by the IF (Intermediate Frequency) local oscillator in phase and quadrature signals 182 $\cos(2\pi f_{IF} t)$ and $\sin(2\pi f_{IF} t)$ provided by the IF local oscillator 180 generating the IF OFCM band pass signal 172 $v_{IF}(t)$ given by $$v_{IF}(t) = Re\{v_o(t)\exp[j2\pi f_{IF} t]\} = Re(v_o(t))\cos(2\pi f_{IF} t) - Im(v_o(t))\sin(2\pi f_{IF} t) \quad (16)$$

In (16) $f_{IF}$ denotes the IF frequency and Re( ) and Im( ) denote the real part and imaginary part operators respectively.

Referring to FIG. 1, the OFCM IF signal $v_{IF}(t)$ is inputted to the RF stages block 175. The RF stages block is inputted by the RF local oscillator signal 187 provided by the RF local oscillator 185 and may be comprised of an up converter, an RF band pass filter and power amplifier providing the RF OFCM signal 190 $v_{RF}(t)$ to the antenna 195. The RF OFCM signal 190 is given by $$v_{RF}(t) = \sqrt{P_G} Re\{v_o(t)\exp[j2\pi f_c t]\} \quad (17)$$

In (17) $f_c$ denotes the carrier frequency of the RF signal, and $P_G$ is the power gain of the RF stages unit 175.

Figure 2:
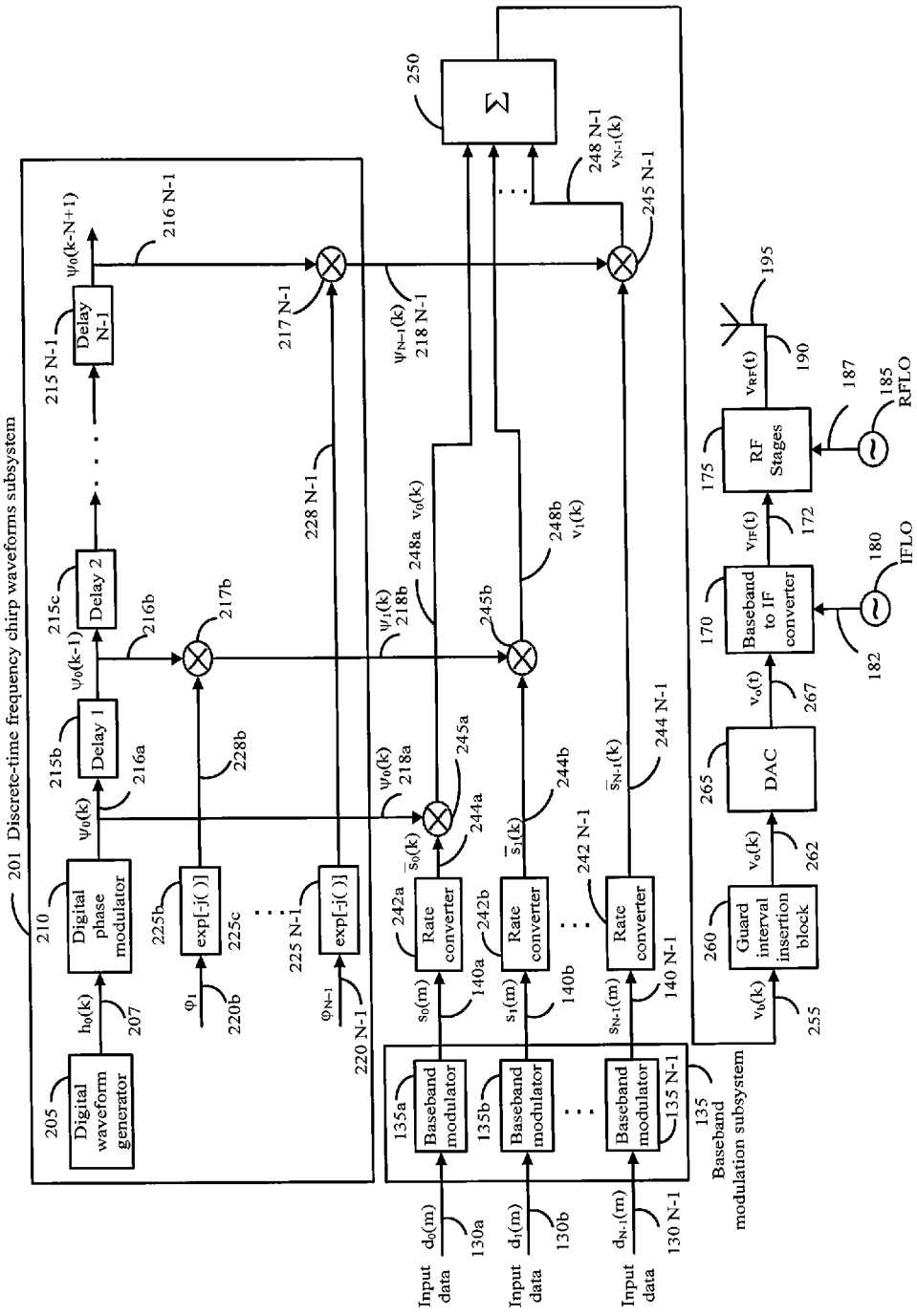
FIG. 2 shows a block diagram of one embodiment of OFCM transmitter.

FIG. 2 shows an alternative embodiment of the OFCM transmitter of the invention wherein the frequency chirp waveforms are digital. The integral $g^I(t)$ of the waveform g(t) in (2a) may be evaluated as $$g^I(t) = \int_0^t g(\tau)d\tau = V_p\left[\frac{t^2}{T_0} - t\right] \quad (18)$$

From (1)-(5) the discrete time version of the frequency chirp waveform $\psi_0(t)$ with a sampling interval $t_s$ equal to $(1/2F_m)$ may be obtained as $$\psi_0(k) = \exp\left[j2\pi F_m\left(\frac{k^2 t_s^2}{T_0} - kt_s\right)\right]; k = 0, 1, \ldots \quad (19)$$

With $2F_m t_s = 1$ and $T_0 = Nt_s$, the expression for $\psi_0(k)$ is given by (20).

$$\psi_0(k) = \exp[j\pi h_0(k)]; h_0(k) = k(k-N)/N; k=0,1,\ldots,N-1 \quad (20)$$

where $h_0(k)$ and $\psi_0(k)$ are periodic with period N.

The discrete time versions of the frequency chirp waveform $\psi_n(t)$; n=1, 2, . . . , N-1 may be obtained by the discrete time versions of the time shifted version of $\psi_0(t)$ with time shift $t_n = nt_s$. The time shifted versions however may have non zero phase $\phi_n$ at k=0. The phase shift $\phi_n$ may be evaluated as $$\varphi_n = -\int_{-nt_s}^{0} D_f g(\tau)d\tau = -\int_{T_0-nt_s}^{T_0} D_f g(\tau)d\tau = \pi n(n-N)/N; \\ n = 1, 2, \ldots, N-1 \quad (21)$$

The phase shift $\phi_n$ may equivalently be evaluated as $\phi_n = \pi h_0(N-n) = \pi n(n-N)/N$. From (5a, b) the discrete-time version of the product $\psi_n(t)\psi_m^*(t)$ is given by $$\psi_n(k)\psi_m^*(k) = \exp\left[j2\pi \int_0^{kt_s} \Delta f_{n,m}(\tau)d\tau\right]; j = \sqrt{-1} \quad (22)$$

Substitution of $t = kt_s$ in (8) results in $$\int_0^{kt_s} \Delta f_{n,m}(\tau)d\tau = \begin{cases} (m-n)k/N; 0 \le k < n \\ [(m-n)k/N] + (n-k); n \le k < m \\ [(m-n)k/N] + (n-m); m \le k < N \end{cases} \quad (23)$$

Substitution for the integral in (22) from (23) results in $$\psi_n(k)\psi_m^*(k) = \exp[j2\pi k(m-n)/N]; m>n; k=0,1,\ldots \quad (24)$$

Summation of both sides of (24) between 0 and N-1 yields $$\sum_{k=0}^{N-1} \psi_n(k)\psi_m^*(k) = \frac{\{\exp[j2\pi(m-n)] - 1\}}{\{\exp[j2\pi(m-n)/N] - 1\}} = 0; m > n \quad (25)$$

The discrete time frequency chirp waveforms $\psi_n(k)$; n=0, 1, ..., N-1 form an orthogonal set of waveforms with $$\sum_{k=0}^{N-1} |\psi_n(k)|^2 = N; n = 0, 1, \ldots, N-1 \quad (26)$$

The set of normalized waveforms $\psi_n(k)/\sqrt{N}$; n=0,1, ..., N-1 is an orthonormal set.

FIG. 2 shows the block diagram of one of the various alternative embodiments of the invention. Referring to the OFCM (Orthogonal Frequency Chirp Multiple Accessing) system transmitter 200 block diagram in FIG. 2, the input data comprised of N users' input data is inputted to the baseband modulation subsystem 135. Referring to FIG. 2, the $n^{th}$ user data 130n $d_n(m)$ is inputted to the baseband modulator 135n for n=0, 1, ..., N-1. The data $d_n(m)$ may be binary valued taking values 0 and 1, wherein m denotes the discrete time. In various embodiments of the invention, the transmitter may be located at the base station of a mobile network and the data $d_n(m)$ may be destined for the mobile user n receiver. In various other embodiments of the invention, the transmitter may be part of the mobile user equipment with the N data streams destined to the same base station, wherein the N data streams may be generated by splitting a single data stream d(m) into N data streams $d_n(m)$ by a serial to parallel converter, not shown in FIG. 2. In various other embodiments of the invention, the serial to parallel converter may split the output of a single baseband modulator inputted by the user data d(m).

The baseband modulator 135n segments the user input data 130n $d_n(m)$ into groups of m binary valued data bits and maps each of the groups of the $m$ binary data bits into one of the M=2$m$, in general complex valued, information baseband symbols 140n $s_n(m)$ with $m$ selected equal to an integer greater than or equal to 1. The one to one mapping of the groups of $m$ binary valued data bits into the corresponding baseband symbol may be based on any of the baseband modulation techniques, selected, for example, from the set of the MQAM (M'ary Quadrature Amplitude Modulation), the MPSK (M'ary Phase Shift Keying), and the MASK (M'ary Amplitude Shift Keying) modulation techniques.

Referring to FIG. 2, the information baseband symbols 140n $s_n(m)$ is inputted to the rate converter 242n; n=0, 1, ..., N-1. The rate converter 242n increases the sampling rate of the information baseband symbol by a factor of N=($T_0$/$t_s$) by repetition of the input 140n $s_n(m)$ N times. Referring to FIG. 2, the output 244n $\bar{s}_n(k)$ of the rate converter 140n is inputted to the spread spectrum modulator 245n; n=0, 1, ..., N-1.

Referring to FIG. 2, the discrete-time frequency chirp waveform subsystem 201 generates the multiplicity N discrete-time frequency chirp waveforms 218 $\psi_0(k), \psi_1(k), \ldots, \psi_{N-1}(k)$. In various embodiments of the invention the number of frequency chirp waveforms N may be different than the number of users' input data N. For example, in various embodiments of the invention the output of one of the rate converter 242n may be modulated by multiple frequency chirp waveforms.

Referring to FIG. 2, digital waveform generator generates the periodic discrete time waveform 207 $h_0(k)=k(k-N)/N$; k=0, 1, ... of period N given by (20). The discrete time waveform 207 $h_0(k)$ is inputted to the digital phase modulator 210 providing the discrete time frequency chirp waveform 216a $\psi_0(k)=\exp[j\pi h_0(k)]$. Referring to FIG. 2, the discrete time frequency chirp waveform 216a $\psi_0(k)$ is inputted to the tapped delay line 215 providing the N-1 delayed versions 216b through 216 N-1 $\psi_0(k-1), \psi_0(k-2), \ldots, \psi_0(k-N+1)$. The N-1 delayed versions 216b, c, ..., N-1 of the discrete time frequency chirp waveform 216a $\psi_0(k)$ are provided to the first inputs of the respective multipliers 217b, c, ..., N-1.

Referring to FIG. 2, the phase shift $\phi_n$ given by (21) and equal to $\pi n(n-N)/N$ is inputted to the exponential function block 225n for n=1, 2, ..., N-1. The exponential function block 225n provides the output 228n $\exp(-j\phi_n)$ to the second input of the multiplier 217n for n=1, 2, ..., N-1. The multiplier 217n subtracts phase shift $\phi_n$ given by (21) from the phase of the delayed version 216n $\psi_0(k-n)$ of the discrete time frequency chirp waveform 216a $\psi_0(k)$ providing the $n^{th}$ discrete-time frequency chirp waveforms $\psi_n(k)$ to the spread spectrum modulator 245n with n equal to b through N-1. Referring to FIG. 2, the frequency chirp waveform 216a $\psi_0(k)$ is inputted to the spread spectrum modulator 245a.

Referring to FIG. 2, the spread spectrum modulators 245a through N-1 modulate the respective rate converted information baseband symbols 244 $\bar{s}_n(k)$ with n equal to 0 through N-1 providing the spread spectrum signals 248 $v_n(k)=\psi_n(k) \bar{s}_n(k)$, n=0, 1, ..., N-1 to the adder 250. The adder sums up the N spread spectrum signals 248 $v_n(k)$ providing the discrete time orthogonal frequency chirp multiple accessing (OFCM) serial signal 225

$$v_b(k) = \sum_{n=0}^{N-1} v_n(k)$$

to the guard interval insertion block 260.

Referring to FIG. 2, the guard interval insertion block 260 introduces a guard band of $N_G$ samples before each of the OFCM symbols, comprised of the consecutive N samples of the OFCM signal 255 $v_b(k)$, to protect against multipath distortion, by the cyclic extension of the serial OFCM signal 255 $v_b(k)$ generating the baseband OFCM signal 262 $v_o(k)$ given by (27) wherein $N_e=N+N_G$.

$$v_o(k) = \sum_{n=0}^{N-1} s_n(m)\psi_n(k - (m-1)N_e); \quad (27)$$

$$(m-1)N_e - N_G \le k < mN_e - N_G; m = 1, 2, \ldots$$

Referring to FIG. 2, the baseband OFCM signal 262 $v_o(k)$ is inputted to the digital to analog converter block 265. The digital to analog converter block 265 converts the OFCM signal into analog form and may also include a band limiting filter such as the square root raised cosine filter providing the analog baseband OFCM signal 267 $v_o(t)$ at the output.

Referring to FIG. 2, the baseband OFCM signal 267 $v_o(t)$ is inputted to the baseband to IF converter 170 that modulates the signal 167 $v_o(t)$ by the IF (Intermediate Frequency) local oscillator in phase and quadrature signals 182 $\cos(2\pi f_{IF}t)$ and $\sin(2\pi f_{IF}t)$ provided by the IF local oscillator 180 generating the IF OFCM band pass signal 172 $v_{IF}(t)$ given by $$v_{IF}(t) = \text{Re}\{v_o(t)\exp[j2\pi f_{IF}t]\} \quad (28)$$

$$= \text{Re}(v_o(t))\cos(2\pi f_{IF}t) - \text{Im}(v_o(t))\sin(2\pi f_{IF}t)$$

In (28) $f_{IF}$ denotes the IF frequency and Re( ) and Im( ) denote the real part and imaginary part operators respectively.

Referring to FIG. 2, the OFCM IF signal $v_{IF}(t)$ is inputted to the RF stages block 175. The RF stages block is inputted by the RF local oscillator signal 187 provided by the RF local oscillator 185 and may be comprised of an up converter, an RF band pass filter and power amplifier providing the RF signal 190 $v_{RF}(t)$ to the antenna 195. The RF signal 190 is given by $$v_{RF}(t) = \sqrt{P_G}\text{Re}\{v_o(t)\exp[j2\pi f_c t]\} \quad (29)$$

In (29) $f_c$ denotes the carrier frequency of the RF signal, and $P_G$ is the power gain of the RF stages unit 175.

Figure 3:
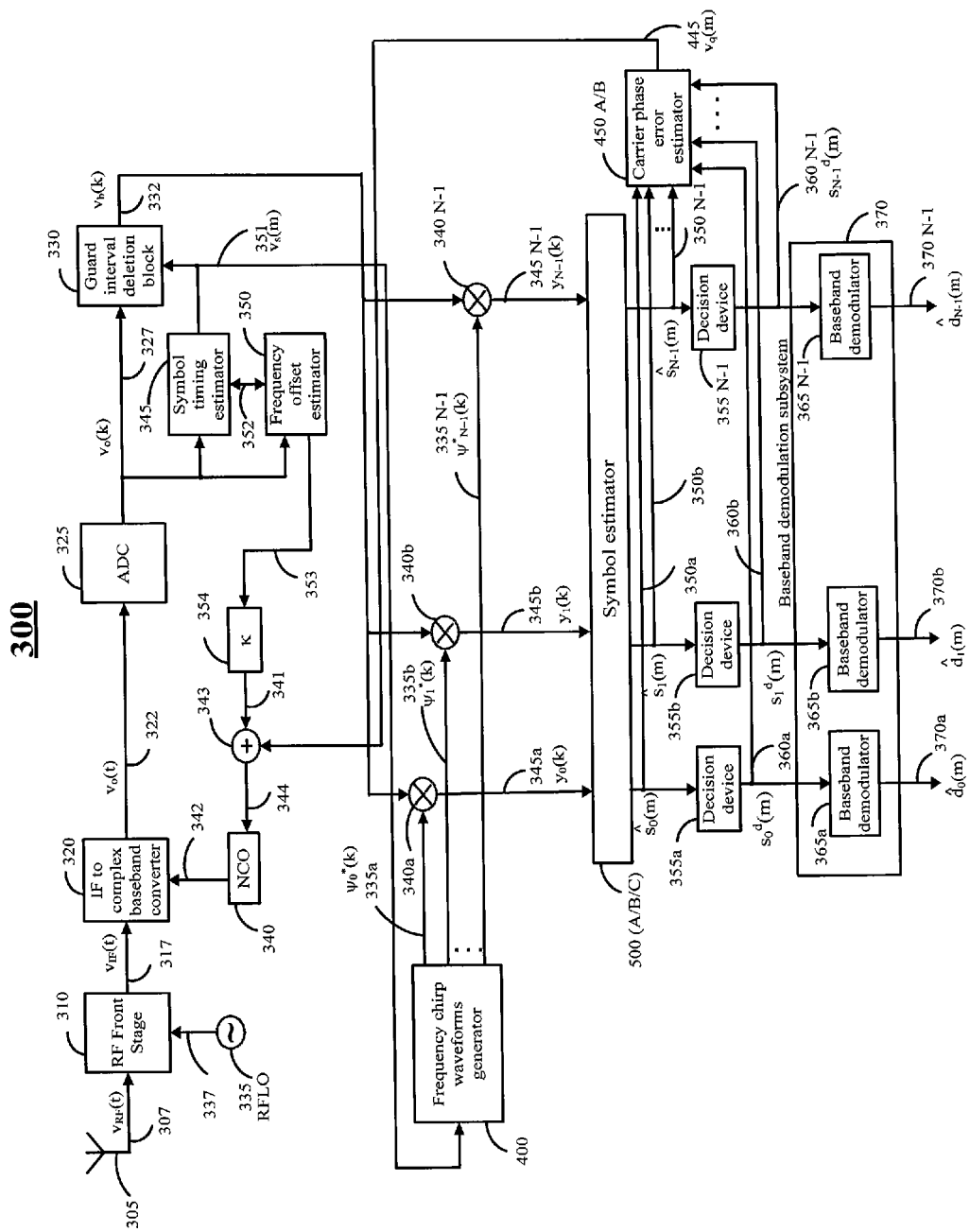
FIG. 3 shows a block diagram of one embodiment of OFCM receiver.

FIG. 3 shows an embodiment of the OCM receiver 300 of the invention. Referring to FIG. 3, the transmitted RF OFCM signal is received by the receive antenna 305 providing the received RF signal 307 $v_{RF}(t)$ to the RF front stage unit 310. The RF front stage unit 310 is provided with the RF local oscillator signal 337 $\cos(2\pi f_{LO}^{RF}t)$ generated by the RF local oscillator 335 wherein the RF local oscillator frequency is given by $f_{LO}^{RF}=(f_c-f_{IF})$. The RF front stage unit 310 may be comprised of a band pass filter to reject out of band noise and interference, a down converter to down convert the center frequency of the input RF signal 307 to some appropriate IF frequency $f_{IF}$, and the RF and IF amplifiers.

Referring to FIG. 3, the RF front stage unit 310 provides the IF signal 317 $v_{IF}(t)$ to the IF to complex baseband converter 320. The IF to complex baseband converter 320 is provided with the IF local oscillator signal in phase and quadrature signals 342 $\cos(2\pi f_{IF}t)$ and $\sin(2\pi f_{IF}t)$ generated by the NCO (Numerically Controlled Oscillator) 340. The IF to complex baseband converter 320 may be comprised of demodulating the IF signal 317 $v_{IF}(t)$ by the in phase and quadrature signals 342 $\cos(2\pi f_{IF}t)$ and $\sin(2\pi f_{IF}t)$ and filtering the resulting signals by the low pass filters. The outputs of the low pass filters comprise of the real and imaginary components of the complex baseband signal 322 $v_o(t)$ at the output of the IF to complex baseband converter 320.

Referring to FIG. 3, the complex baseband signal 322 $v_o(t)$ is inputted to the analog to digital converter (ADC) 325 for conversion of the signal 322 into digital form providing the discrete-time baseband OFCM signal 327 $v_o(k)$ at the output of the ADC 325. The sampling rate for the ADC may be selected equal to $2F_m=1/t_s$.

Referring to FIG. 3, the OFCM signal 327 $v_o(k)$ is inputted to the symbol timing estimator 345. The symbol timing estimator provides the OFCM symbol synchronization signal 351 to the guard interval deletion block and is comprised of a clock pulse at the beginning of each $T_{oe}$ period comprised of N samples of the OFCM symbol and $N_G$ samples of the cyclic prefix of the OFCM symbol.

Referring to FIG. 3, the baseband OFCM signal 327 $v_o(k)$ is inputted to the frequency offset estimator 350 for estimating any frequency offset between the center frequency of the received IF signal 317 and the frequency of the reference signal 342 provided by the NCO 340. The frequency offset may be the result of any difference or drift of the local oscillator frequencies at the transmitter and receiver, and any Doppler shift introduced by the transmission channel.

The estimation of the symbol timing and the frequency offset may be performed by the use of redundant information contained in the $N_G$ samples of the cyclic prefix that is identical to the last $N_G$ samples of the OFCM symbol as taught by J. van de Beek, et. al., in, "ML Estimation of Time and Frequency Offset in OFDM Systems," IEEE Transactions on Signal Processing, Vol. 45, No. 7, July 1997, pp. 1800-1805 included with this application by reference. In various alternative embodiments of the invention, a unique training symbol with two identical halves may be used for the purpose of the estimation of the symbol timing and the frequency offset as is taught by T. M. Schmidl and D. C. Cox in, "Robust Frequency and Timing Synchronization for OFDM," IEEE Transactions on Communications, Vol. 45, No. 12, December 1997, pp. 1613-1621 included with this application by reference. The teachings of Beek, et. al., and those of Schmidl and Cox originally for the OFDM systems may also be applied to the OFCM systems of the invention.

Referring to FIG. 3, the discrete-time baseband OFCM signal 327 $v_o(k)$ is inputted to the guard interval deletion block 330. The guard interval deletion block 330 deletes the $N_G$ samples of the cyclic prefix of the extended OFCM symbols providing the baseband OFCM signal 332 $v_b(k)$ at the output. Referring to FIG. 3, the serial OFCM signal 332 $v_b(k)$ is inputted to the spread spectrum demodulators 340 a through N-1.

Referring to FIG. 3, the OFCM symbol synchronization signal 351 $v_s(m)$ is provided to the frequency chirp waveforms generator 400 for the timing synchronization of the waveform generator to the timing of the received OFCM signal. The frequency chirp waveforms generator 400 generates the complex conjugates of the frequency chirp waveforms 335 0,1, ..., N-1 $\psi_0^*(k), \psi_1^*(k), ..., \psi_{N-1}^*(k)$.

Referring to FIG. 3, complex conjugates of the frequency chirp waveforms 335 0,1, ..., N-1 $\psi_0^*(k), \psi_1^*(k), ..., \psi_{N-1}^*(k)$ are provided to the spread spectrum demodulators 340 a through N-1. The spread spectrum demodulators 340n multiplies the serial OFCM signal 332 $v_b(k)$ by the complex conjugates of the frequency chirp waveforms 335n $\psi_n^*(k)$ providing the output 345n $y_n(k)=\psi_n^*(k)v_b(k)$; n=0, 1, ..., N-1 to the symbol estimator 500(A/B/C). The symbol estimator 500(A/B/C) provides the linear estimates of the symbols 350n $\hat{s}_n(m)$ to the decision device 355n; n=0, 1, ..., N-1.

Referring to FIG. 3, the decision device 355n; n=0, 1, ..., N-1 detects the information baseband symbols on the basis of the signal constellation diagram of the baseband modulator 135n at the OFDM transmitter of FIGS. 1-2 by mapping the estimate 350n $\hat{s}_n(m)$ into one of the points of the signal constellation diagram of the baseband modulator 135n in the two dimensional signal space and provides the detected symbol $s_n^d(m)$; n=0, 1, ..., N-1 to the baseband demodulation subsystem 370. For example, the baseband modulator may be an M=64 QAM modulator with 64 points in the signal constellation diagram. The detection of the information baseband symbols may be based on, for example, the maximum likelihood criteria or the minimum distance criteria in the two dimensional signal space.

Referring to FIG. 3, the detected baseband symbol 360n $s_n^d(m)$ is inputted to the baseband demodulator 365n; n=0, 1, ..., N-1. The baseband demodulator 365n; n=0, 1, ..., N-1 maps the detected baseband symbols $s_n^d(m)$ into groups of $m$ binary digits, wherein $m = \log_2(M)$ assumed to be an integer, using the inverse of the map from group of $m$ binary digits into 1 out of M possible information baseband symbols used in the baseband modulator 135n at the OFCM transmitter. The baseband demodulator block 365n may finally concatenate the groups of M binary digits into the serial stream 370n $\hat{d}_n(m)$ that constitutes the detected version of the user n input data 130n $d_n(m)$ at the OFCM transmitter. In various embodiments of the invention, the baseband demodulator may also be comprised of an error correction decoder and a deinterleaver.

In various embodiments of the invention, $N_u \leq N$ data streams may be obtained by splitting an user data d(n) at the OFCM transmitter and a parallel to serial converter, not shown, may combine the corresponding $N_u$ serial data stream $370n \, \hat{d}_n(m)$ providing the estimate $\hat{d}(n)$ of d(n) in the OFCM receiver 300.

Referring to FIG. 3, the frequency offset 353 $\Omega_o$ in radians/second provided by the frequency offset estimator is multiplied by $\kappa$ in the block 354 with the result provided to the adder 343. The gain $\kappa$ is selected such that the product $\kappa K_v \leq 1$ wherein $K_v$ is the sensitivity of the NCO 340 in rad/sec/volt. In various embodiments of the invention the frequency offset may be averaged over more than one OFCM symbols, before being inputted to the cascade of the adder 343 and the NCO 340, with the estimate held constant after the initial estimation period. In various alternative embodiments of the invention, $\kappa$ is selected such that $\kappa K_v = \lambda_o$; $0 < \lambda_o < 1$ wherein the exponential data weighting coefficient 1 is selected close to 1, for example $\lambda_o = 0.9$, with the frequency offset being estimated in each of the OFCM symbol periods.

Referring to FIG. 3, the linear estimates of the symbols $350n \, \hat{s}_n(m)$ and the detected baseband symbols $360n \, s_n^d(m)$; n=0, 1, . . . , are inputted to the carrier phase error estimator unit 450A/B. The carrier phase error estimator unit 450A/B estimates the phase error between the carrier phase of the received IF signal 317 and the phase of the reference signal 342 provided by the NCO 340 and generates a correction signal 445 $v_q(m)$. Referring to FIG. 3, the correction signal 445 $v_q(m)$ is inputted to the cascade of the adder 343 and the NCO 340 for correcting the phase of the reference signal 342 such that the phase error is driven to 0 with increasing number of received OFCM symbols.

Figure 4:
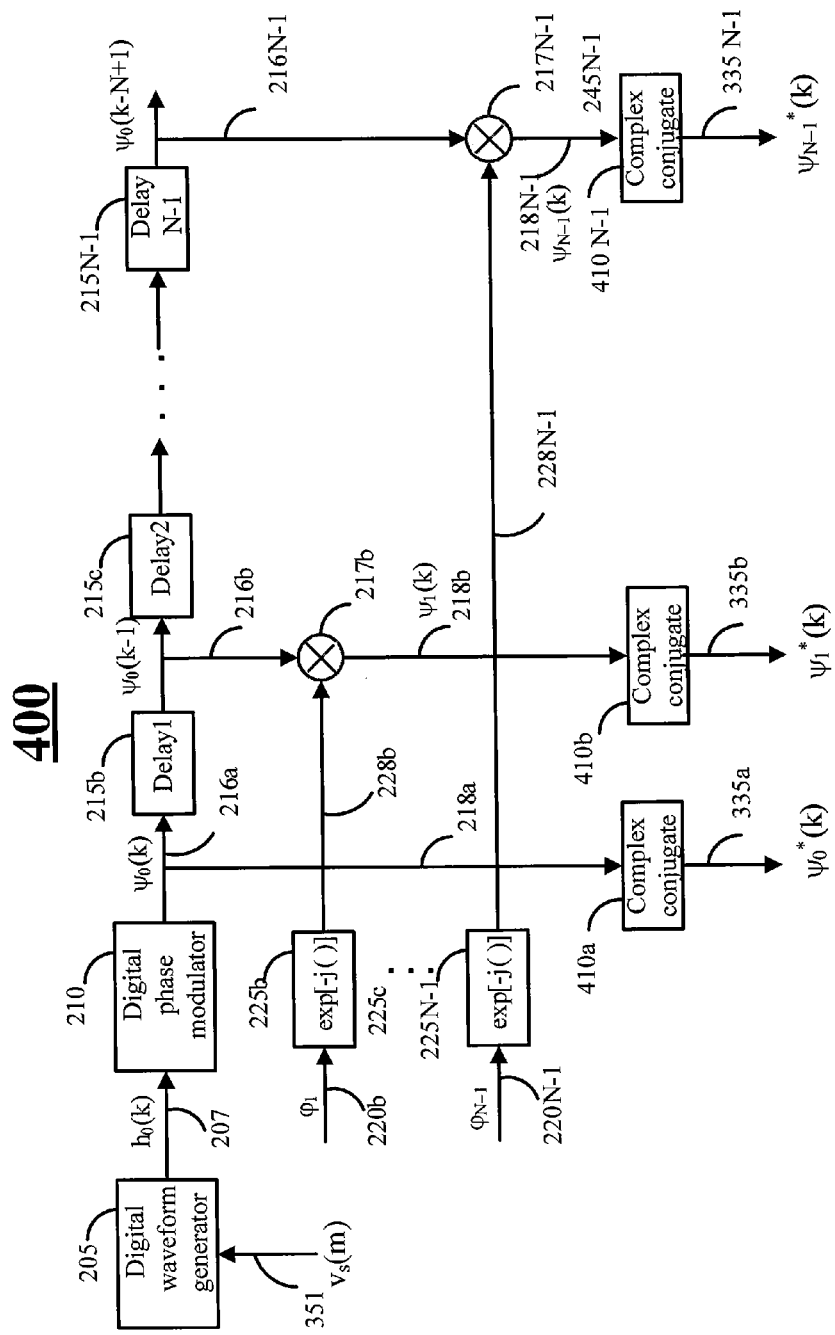
FIG. 4 shows a block diagram of one embodiment of multiple frequency chirp waveforms generator.

FIG. 4 shows the block diagram of the frequency chirp waveforms generator 400. Referring to FIG. 4, the digital waveform generator 205 generates the periodic discrete time waveform 207 $h_0(k) = k(k-N)/N$; $k=0, 1, \ldots$ of period N given by (20). Referring to FIG. 4, the OFCM symbol timing synchronization signal 351 $v_s(m)$ is provided to the digital waveform generator 205 for synchronizing the period of the waveform $h_o(k)$ to the OFCM symbol period of the received baseband OFCM signal $v_o(k)$. The discrete time waveform 207 $h_0(k)$ is inputted to the digital phase modulator 210 providing the discrete time frequency chirp waveform 216a $\psi_0(k) = \exp[j\pi h_0(k)]$, $j=\sqrt{-1}$. Referring to FIG. 4, the discrete time frequency chirp waveform 216a $\psi_0(k)$ is inputted to the tapped delay line 215 providing the N-1 delayed versions 216b through 216 N-1 $\psi_0(k-1), \psi_0(k-2), \ldots, \psi_0(k-N+1)$. The N-1 delayed versions 216b, c, . . . , N-1 of the discrete time frequency chirp waveform 216a $\psi_0(k)$ are provided to the first inputs of the respective multipliers 217b, c, . . . , N-1.

Referring to FIG. 4, the phase shift $\phi_n$ given by (21) and equal to $\pi n(n-N)/N$ is inputted to the exponential function block 225n for n=1, 2, . . . , N-1. The exponential function block 225n provides the output 228n $\exp(-j\phi_n)$ to the second input of the multiplier 217n for n=1, 2, . . . , N-1. The multiplier 217n subtracts phase shift $\phi_n$ given by (21) from the phase of the delayed version 216n $\psi_0(k-n)$ of the discrete time frequency chirp waveform 216a $\psi_0(k)$ providing the $n^{th}$ discrete time frequency chirp waveform $\psi_n(k)$. Referring to FIG. 3, the discrete time frequency chirp waveforms $\psi_n(k)$; n=0, 1, . . . , N-1 are inputted to the complex conjugate blocks 410n providing the complex conjugate of the frequency chirp waveform 335n $\psi_n^*(k)$ at the outputs.

Figure 4A:
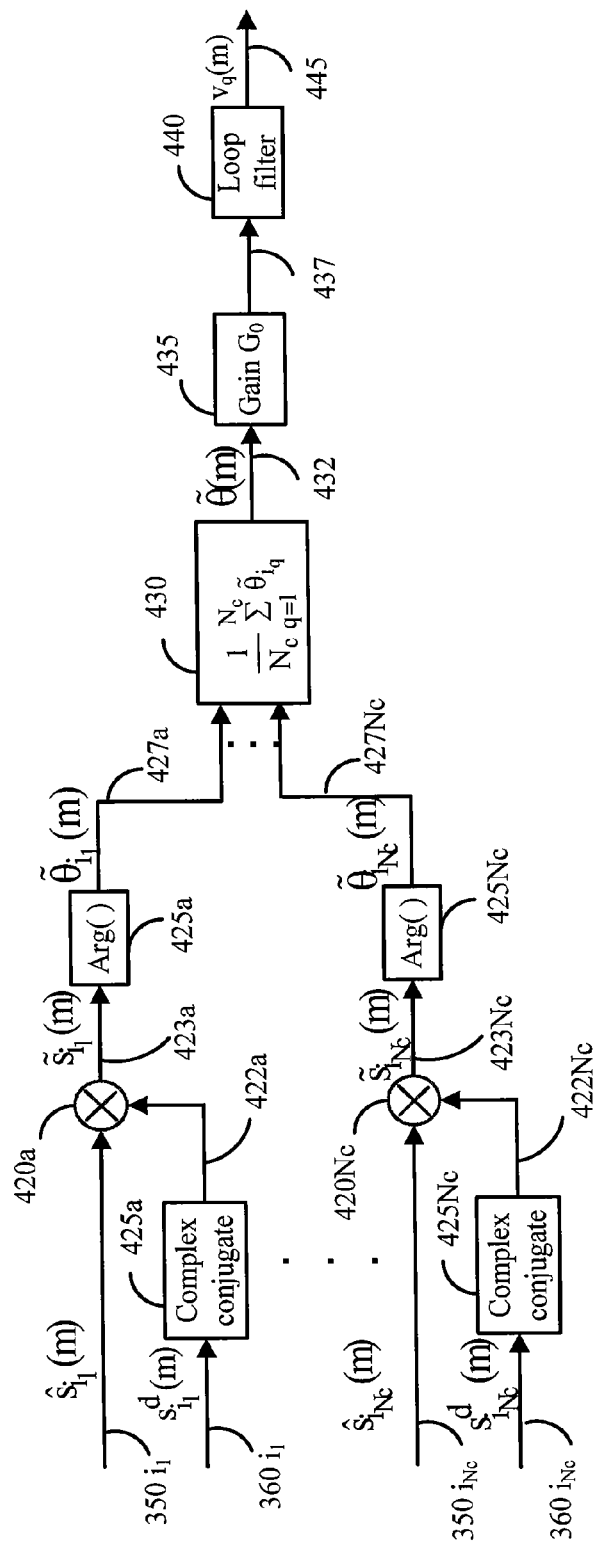
FIG. 4A shows a block diagram of one embodiment of carrier phase tracking loop.

FIG. 4A shows an embodiment of the carrier phase error estimator 450A. Referring to FIG. 4A, the $N_c$ selected linear estimates of the symbols 350 $i_1, \ldots, i_{N_c} \, \hat{s}_{i_1}, \ldots, \hat{s}_{i_{N_c}}$ are inputted to the multipliers 420 $i_1, \ldots, i_{N_c}$ respectively wherein the integer number $N_c$ may be selected to have a value between 1 and N. In various embodiments of the invention wherein the OFCM receiver 300 is located in the mobile user terminal, $N_c$ may be selected to be equal to the number of OFCM signals 248, $v_n(k)$ destined to the user terminal. Referring to FIG. 4A, the detected symbols 360 $i_1, \ldots, i_{N_c} \, s_{i_1}^d, \ldots, s_{i_{N_c}}^d$ are inputted to the complex conjugate blocks 425a, b, . . . , $N_c$ providing the outputs 422a, b, . . . , $N_c \, s_{i_1}^{d*}, \ldots, s_{i_{N_c}}^{d*}$ to the multipliers 420a, b, . . . , $N_c$ wherein * denotes the complex conjugate and the notation a, b, . . . , $N_c$ is used interchangeably with the notation $i_1, \ldots, i_{N_c}$. Referring to FIG. 4A, the outputs 423a, b, . . . , $N_c$ of the multipliers 420 are given by $$\tilde{s}_{i_n} = \hat{s}_{i_n} s_{i_n}^{d*}; \, n=1, 2, \ldots, N_c \quad (30)$$

Referring to FIG. 4A, the error signals 423a, b, . . . , $N_c$ are inputted to the arg( ) blocks 425 for the computation of the phase of the error signals 423. The cascade of the multiplier 420 n and the arg( )block 425n constitute the phase error detector n. The outputs of the arg( )blocks 427a, b, . . . , $N_c \, \tilde{\theta}_{i_1}, \tilde{\theta}_{i_2}, \ldots, \tilde{\theta}_{i_{N_c}}$ constitute $N_c$ different estimates of the phase error between the carrier phase of the received IF signal 317 and the phase of the reference signal 342 provided by the NCO 340.

Referring to FIG. 4A, the $N_c$ phase error estimates 427 a through $N_c \, \tilde{\theta}_{i_1}, \tilde{\theta}_{i_2}, \ldots, \tilde{\theta}_{i_{N_c}}$ are averaged by the averaging block 430 providing the average phase error 430 $\tilde{\theta}(m)$ to the cascade of the gain block 435 and the loop filter 440. The output of the loop filter 445 $v_q(m)$ constitutes a correction signal provided to the NCO 340 such that the phase error $\tilde{\theta}(m)$ is driven to 0 with increasing m.

Referring to FIG. 4A, the cascade comprised of the complex conjugate blocks 422, the multipliers 420, the arg( ) blocks 425 and the averaging block 430 constitutes the composite phase error detector. The subsystem comprised of the composite phase error detector, the gain block 435, the loop filter 440 that may be a digital filter, and the NCO 340 is a phase locked loop. The gain 435 $G_0$ and the transfer function of the digital loop filter 440 may be determined on the basis of the teachings of Kumar and Hurd in, "A Class of Optimum Digital Phase Locked Loops for the DSN Advanced Receiver," TDA Progress Report 42-83, July-September 1985, Jet Propulsion Laboratory, California Institute of Technology, pp. 63-80, included with this application by reference.

Figure 4B:
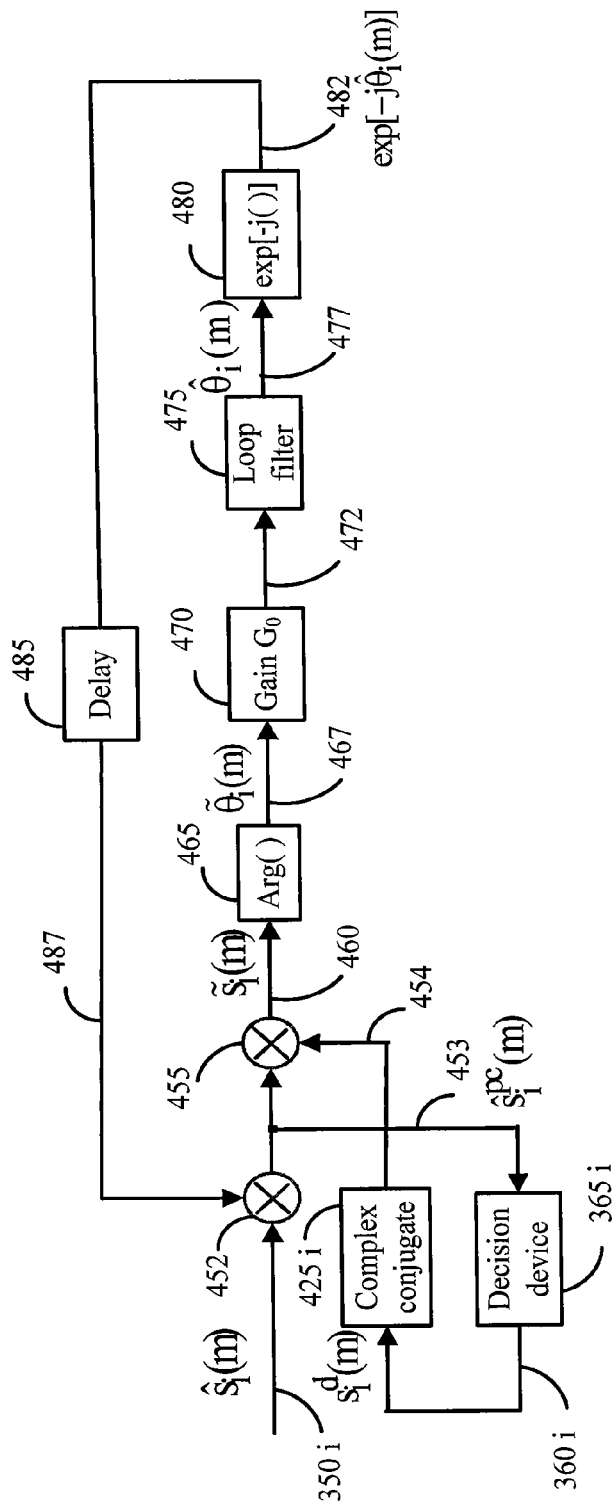
FIG. 4B shows a block diagram of one embodiment of carrier phase tracking loop.

FIG. 4B shows an embodiment of the carrier phase error estimator 450B. In various embodiments of the invention wherein the OFCM receiver 300 is located, for example, at the base station of a mobile network, the carrier phase of the OFCM signals transmitted from different mobile user terminals may be all different and may need to be tracked separately. Referring to FIG. 4B, the linear estimate 350i $\hat{s}_i(m)$ with i in the range of 0 to N-1 is inputted to the phase corrector 452. The output of the phase corrector 452 $\hat{s}_i^{pc}(m)$ constituting the phase corrected linear symbol estimate is inputted to the decision device 365i that is made part of the carrier phase error estimator 450B. Referring to FIG. 4B, the output of the decision device 360i $s_i^d(m)$ is complex conjugated by the complex conjugate block 425i providing the output 454 $s_i^{d*}(m)$ to the multiplier 455.

Referring to FIG. 4B, the phase corrected symbol estimate 453 $\hat{s}_i^{pc}(m)$ is inputted to the multiplier 455 for providing the output 460 $\tilde{s}_i(m)$ to the arg( ) 465 block and given by $$\tilde{s}_i(m) = \hat{s}_i^{pc}(m) s_i^{d*}(m) \quad (31)$$

Referring to FIG. 4B, the arg( ) 465 block provides the residual phase error 467 $\hat{\theta}_r(m)$ to the cascade of the gain block 470 and the loop filter 475. The output $\hat{\theta}_i(m)$ of the loop filter 477 is inputted to the phase modulator 480 that provides the output $\exp[-j\hat{\theta}_i(m)]$; $j=\sqrt{-1}$ to the delay 485. Referring to FIG. 4B, the delayed output 487 $\exp[-j\hat{\theta}_i(m-1)]$ is inputted to the phase corrector 452 for correcting the phase of the linear symbol estimate $350i$ $\hat{s}_i(m)$.

Figure 5A:
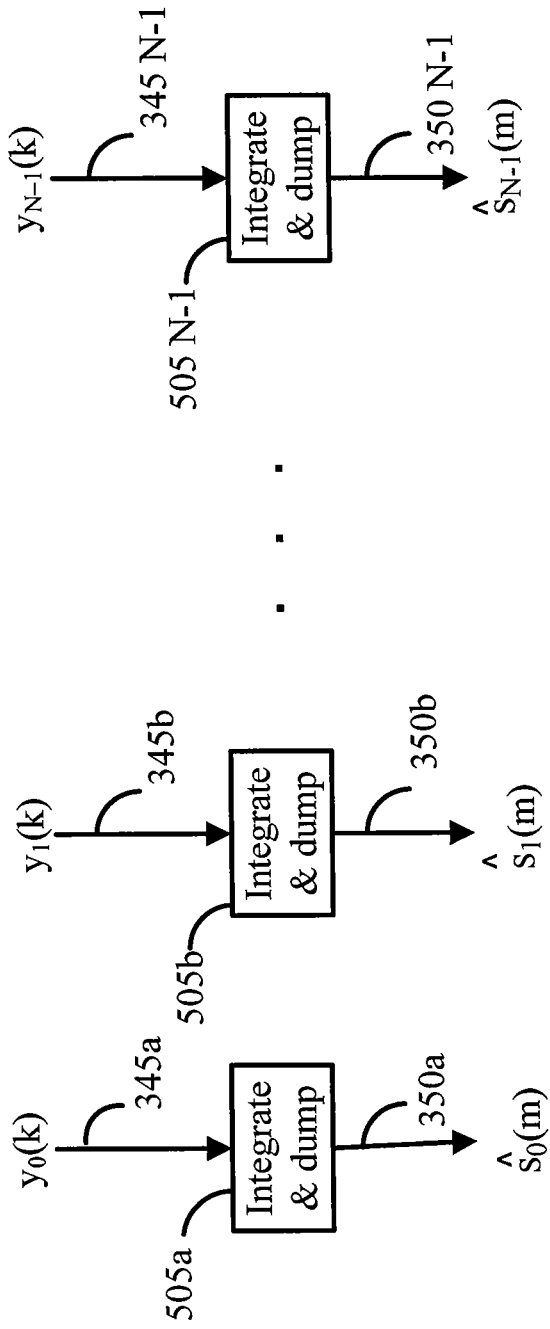
FIG. 5A shows a block diagram of one embodiment of symbol estimator.

FIG. 5A shows an embodiment of the symbol estimator 500A. The embodiment shown in FIG. 5A may be for the case when the communication channel is either non fading or exhibits non frequency selective or flat fading characteristics. Referring to FIG. 5A, the signals 345a, b, . . . , N-1 $y_0(k)$, . . . , $y_{N-1}(k)$ are inputted to the matched filter integrate and dump units 505a through N. The integrate and dump unit 505n integrates the input 345n $y_n(k)$ over N samples and normalizes the sum by N providing the linear estimate of the symbol 350n $\hat{s}_n(m)$; n=0, 1, . . . N-1, given by $$\hat{s}_n(m) = \frac{1}{N} \sum_{k=(m-1)N+1}^{mN} y_n(k); m = 1, 2, \dots \quad (32)$$

Figure 5B:
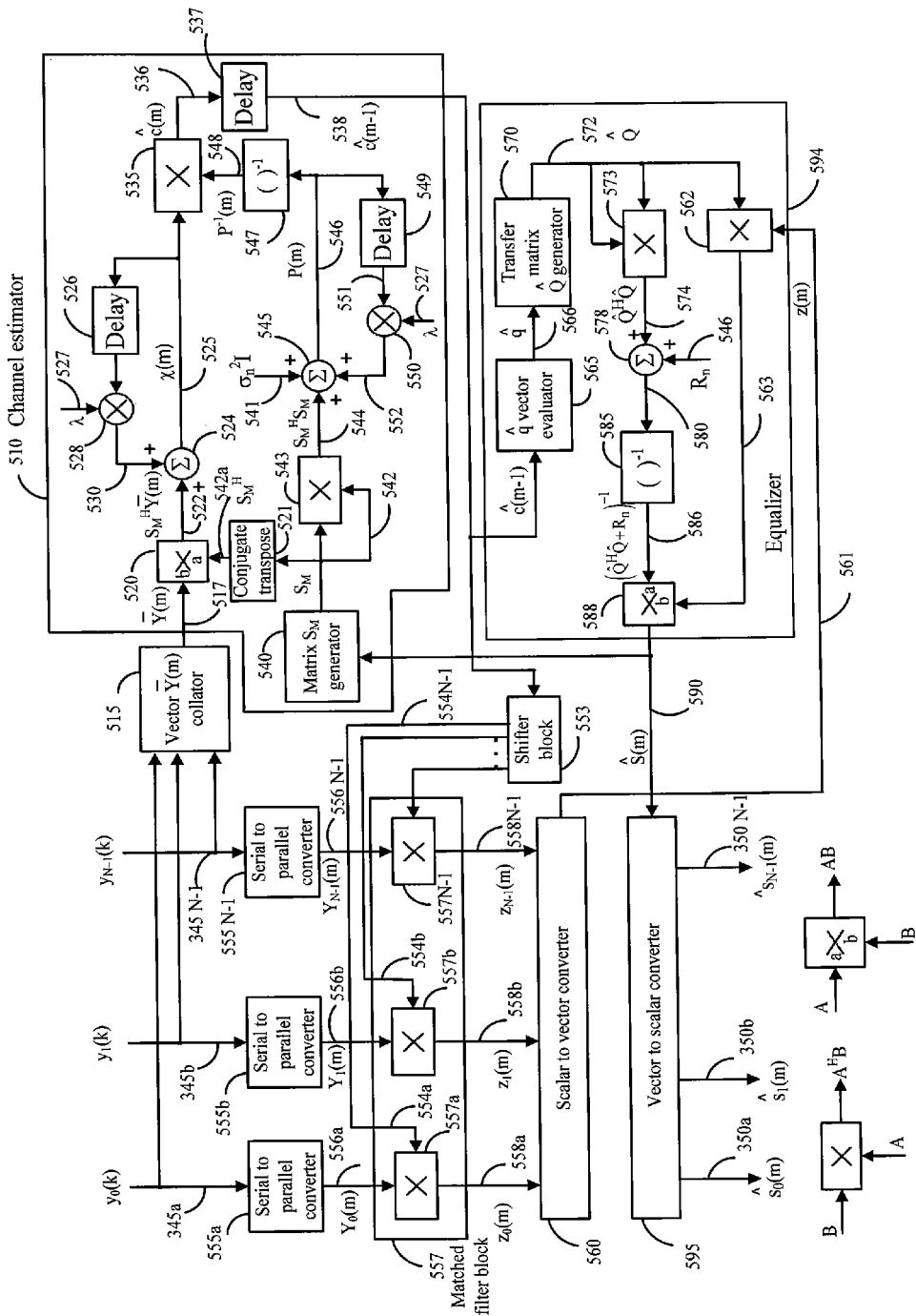
FIG. 5B shows a block diagram of one embodiment of symbol estimator.

FIG. 5B shows an embodiment of the symbol estimator 500B. The embodiment shown in FIG. 5B may be for the case when the communication channel exhibits frequency selective fading characteristics and the various user signals traverse the same communication channel as is the case of transmission, for example, on the forward link from the base station to the mobile user terminals in a wireless communication network. Referring to FIG. 5B, the symbol estimator 500B is comprised of a matched filter block 557, a channel estimator 510 and an equalizer 594.

Referring to FIG. 5B, the signals 345a,b, . . . , N-1 $y_0(k)$, . . . , $y_{N-1}(k)$ are inputted to the serial to parallel converters 555a,b, . . . , N-1. The serial to parallel converter 555n; n=0, 1, . . . , N-1 collates the N samples of signal 345n $y_n(k)$ in any OFCM symbol period into the vector 556n $Y_n(m)$ with $$Y_n(m) = [y_n(k_0) y_n(k_0+1) \dots y_n(k_0+N-1)]^T; k_0 = ((m-1)N+1); m=1,2,\dots \quad (33)$$

In (33) T denotes the matrix transpose. Referring to FIG. 5B, the channel estimator 510 provides the estimate of the communication channel frequency response vector $\hat{c}(m-1)$ with $$\hat{c}(m) = [\hat{c}_0(m) \hat{c}_1(m) \dots \hat{c}_{N-1}(m)]^T; m=1,2,\dots \quad (34)$$

In (34) $\hat{c}_n(m)$ is the estimate of the channel frequency response $c_n$ at the RF frequency $f_n^{RF} = f_c - F_m + n(2F_m/N)$ or correspondingly at the baseband frequency $f_n = -F_m + n(2F_m/N) = -F_m + n/T_0$; n=0, 1, . . . , N-1. The N samples in any OFCM period of the $0^{th}$ spread spectrum signal 248n $v_n(k)$ are effectively multiplied by the frequency response $c_n$; n=0, 1, . . . , N-1 during the transmission over the frequency selective communication channel. The N samples in any OFCM period of the of the $1^{st}$ baseband OFCM signal 248b $v_1(k)$ are respectively multiplied by the components of the circularly shifted version of the frequency response vector $c^1 = [c_{N-1} c_0 c_1 \dots c_{N-2}]^T$. In general the N samples in any OFCM period of the $n^{th}$ spread spectrum signal 248n $v_n(k)$ are respectively multiplied by the components of the n times circularly shifted version $c^n$ of the frequency response vector $c = [c_0 c_1 \dots c_{N-1}]^T$.

Referring to FIG. 5B, the estimate of the channel frequency response vector 538 $\hat{c}(m-1)$ is inputted to the shifter block 553. The shifter block 553 provides the N times shifted version 554n $\hat{c}^n(m-1)$ of the channel frequency response vector $\hat{c}(m-1)$ to the respective matched filter 557n in the matched filter block 557. Referring to FIG. 5B, the matched filter 557n provides the output 558n $z_n(m)$ given by $$z_n(m) = \hat{c}^{nH}(m-1) Y_n(m); n=0,1,\dots N-1; m=1,2,\dots \quad (35)$$

In (35) H denotes the Hermitian transpose.

Referring to FIG. 5B, the matched filter outputs 558n $z_n(m)$; n=0, 1, . . . , N-1 are inputted to the scalar to vector converter 560 for providing the vector 561 $z(m)$ comprised of the components $z_n(m)$ to the equalizer 594.

Referring to FIG. 5B, the signals 345a,b, . . . , N-1 $y_0(k)$, . . . , $y_{N-1}(k)$ are inputted to the vector $\overline{Y}(m)$ collator 515 for providing the signal vector 517 $\overline{Y}(m)$ given by (36).

$$\overline{Y}(m) = [y_0(k_0) y_1(k_0+1) \dots y_{N-1}(k_0+N-1)]^T; m=0, 1, \dots \quad (36)$$

Referring to FIG. 5B, the channel estimator 510 provides an exponentially data weighted least squares estimate of the channel frequency response vector c. Referring to FIG. 5B, the symbol estimates vector 590 $\hat{S}(m)$ comprised of the linear symbol estimates $\hat{s}_n(m)$ as components with $\hat{S}(m) = [\hat{s}_0(m) \hat{s}_1(m) \dots \hat{s}_{N-1}(m)]^T$, is inputted to the matrix $S_M$ generator 540. Referring to FIG. 5B, the matrix $S_M$ generator 540 generates the N×N matrix 542 $S_M$ with elements of $S_M$ derived from the elements of the symbol estimates vector 590 $\hat{S}(m)$ as given by (37).

$$S_M = \hat{S}_{0M}(m) \square A^H \quad (37)$$

In (37) H denotes the Hermitian transpose, $\square$ denotes component wise multiplication, and $\hat{S}_{0M}(m)$ is the estimate of the Toeplitz matrix $S_{0M}$ given by (38) wherein the elements of $S_{0M}$ are comprised of the information baseband symbols 140 $s_n(m)$; n=0, 1, . . . , N-1.

$$S_{0M}(m) = \begin{bmatrix} s_0(m) & s_{N-1}(m) & s_{N-2}(m) & \dots & s_1(m) \\ s_1(m) & s_0(m) & s_{N-1}(m) & \dots & s_2(m) \\ \dots & \dots & \dots & \dots & \dots \\ s_{N-1}(m) & s_{N-2}(m) & s_{N-3}(m) & \dots & s_0(m) \end{bmatrix} \quad (38)$$

The elements of the matrix $\hat{S}_{0M}(m)$ are the linear estimates $\hat{s}_n(m)$ of the corresponding elements $s_{n0}(m)$ of the matrix $S_{0M}$. The matrix $A$ in (37) is the Fourier transform matrix given by (39).

$$A = \begin{bmatrix} 1 & 1 & 1 & \dots & 1 \\ 1 & a & a^2 & \dots & a^{N-1} \\ \dots & \dots & \dots & \dots & \dots \\ 1 & a^{N-1} & a^{2(N-1)} & \dots & a^{(N-1)(N-1)} \end{bmatrix}; \quad (39)$$

$$a = \exp(-j2\pi/N); j = \sqrt{-1}$$

The signal vector 517 $\overline{Y}(m)$ may be expressed in terms of the matrix $S_{0M}$ by (40).

$$\overline{Y}(m) = (S_{0M} \square A) c + v(m) \quad (40)$$

where in (40) $v(n)$ is the additive complex baseband noise vector arising due to the receiver noise present with the IF signal 317 $v_{IF}(t)$. The least squares estimate of the channel frequency response vector c may be obtained in terms of the signal vector 517 $\overline{Y}(m)$ and is given by $$\hat{c}(m) = [S_M^H S_M + \sigma_n^2 I]^{-1} S_M^H \hat{Y}(m); S_M = \hat{S}_{0M} \square A; \quad m=1, 2, \dots \quad (41)$$

where in (41) $\sigma_n^2$ is the variance of the elements of the vector v(n) and I is the identity matrix. A more accurate estimate ĉ(m) of the channel frequency response vector c may be obtained in terms of the signal vectors 517 $\overline{Y}(l)$; l=1,2, ..., m. An exponentially data weighted least squares algorithm for the estimate ĉ(m) is given by $$P(m)=\lambda P(m-1)+S_M^H S_M+\sigma_n^2 I; \ m=1,2,\ldots \quad (42)$$

$$\chi(m)=\lambda\chi(m-1)+S_M^H \overline{Y}(m); \ m=1,2,\ldots \quad (43)$$

$$\overline{c}(m)=P^{-1}(m)\chi(m); \ m=1,2,\ldots \quad (44)$$

In (42)-(43) λ is the exponential data weighting factor with 0<λ<1 and determines the approximate estimation time period given by 1/(1−λ) and P(0) and χ(0) may be some appropriately selected initial values, for example, P(0)=εI and χ(0)=0 where ε is some small positive number and I is the identity matrix. Thus with λ=0.99, about 100 signal vectors 517 $\overline{Y}(l)$ are used in the estimation of the channel frequency response vector c. The value of less λ than 1 permits the adaptation of the estimation algorithm to time varying c. In various embodiments of the invention other estimation algorithms such as recursive least squares, Kalman filter, and LMS algorithms may be used for the estimation of the vector c.

Referring to FIG. 5B, the signal vector 517 $\overline{Y}(m)$ is multiplied by the matrix 542a $S_M^H$ by the matrix multiplier 520 providing the output 522 $S_M^H \overline{Y}(m)$ at the multiplier output. Referring to FIG. 5B, the loop comprised of the adder 524, the delay 526, and the λ-multiplier 528 generates the vector 525 χ(m) given by (43). Referring to FIG. 5B, the matrix 542 $S_M$ is provided to both the inputs of the conjugate multiplier 543 for providing the matrix product 544 $S_M^H S_M$ to the adder 545. Referring to FIG. 5B, the loop comprised of the adder 545, the delay 549, and the multiplier 550 generates the matrix 546 $P(m)=P^H(m)$ given by (42).

Referring to FIG. 5B, the matrix 546 P(m) is inverted by the block 547 providing the inverse matrix 548 $P^{-1}(m)$ to the conjugate multiplier 535. Referring to FIG. 5B, the vector 525 χ(m) is inputted to the conjugate multiplier 535 and is pre multiplied by the matrix 548 $P^{-1}(m)$ providing the estimate of the channel frequency response vector 536 $\overline{c}(m)$ at the output of conjugate multiplier 535.

Referring to FIG. 5B, the scalar to vector converter 560 output vector 561 z(m) may be expressed in terms of the symbol vector $S(m)=[s_0(m)s_1(m) \ldots s_{N-1}(m)]^T$ as $$z(m)=QS(m)+v(m) \quad (45)$$

$$Q=\mathcal{B}^{-1}(Q_0 \odot \mathcal{A}) \quad (46)$$

In (45) v(m) is the noise present at the output of the matched filter block 557, $\mathcal{A}$ is the matrix given by (39) and $\mathcal{B}$ is the diagonal matrix given by $$\mathcal{B}=\frac{1}{\sqrt{-1}}[\text{Diag}\{1 \ a^1 \ a^{2^2} \ a^{3^2} \ldots a^{(N-1)^2}\}]; \ a=\exp(-j2\pi/N); j=\sqrt{-1} \quad (47)$$

In (46) the matrix $Q_0$ is the Toeplitz matrix given by $$Q_0 = \begin{bmatrix} q_0 & q_1 & q_2 & \cdots & q_{N-1} \\ q_{N-1} & q_0 & q_1 & \cdots & q_{N-2} \\ \cdots & \cdots & \cdots & \cdots & \cdots \\ q_1 & q_2 & q_3 & \cdots & q_0 \end{bmatrix} \quad (48)$$

with $$q_n=(\mathcal{A}_n \odot c^H)c^n; \ n=0,1,\ldots,N-1 \quad (49)$$

In (49) $\mathcal{A}_n$ is the $n^{th}$ row of the matrix $\mathcal{A}$, and $c^n$ is the n times circularly shifted version of the channel frequency response vector c. For example $q_1$ is given by $$q_1 = [c_0^* \ ac_1^* \ \ldots \ a^{N-1} c_{N-1}^*]\begin{bmatrix} c_{N-1} \\ c_0 \\ \vdots \\ c_{N-2} \end{bmatrix} \quad (50)$$

The symbol vector S(m) may be estimated form (45)-(50) as $$\hat{S}(m)=[\hat{Q}^H \hat{Q}+R_n]^{-1}\hat{Q}^H z(m); \ m=1,2,\ldots \quad (51)$$

In (51) the matrix $\hat{Q}$ may be obtained from Q by replacing $c_n$ by the estimate $\hat{c}_n(m-1)$; n=0, 1, ..., N-1 in (48)-(50). The matrix $R_n$ in (51) is the covariance matrix of the noise vector v(n) and may be estimated as $$R_n \| \hat{c}(m-1)\|^2 \sigma_n^2 I; \quad (52)$$

Referring to FIG. 5B, the estimate of the channel frequency response vector $\hat{c}_n(m-1)$ is inputted to the $\hat{q}$ vector evaluator 565. The $\hat{q}$ vector evaluator 565 evaluates the element $\hat{q}_n$ of vector 566 $\hat{q}$ from (49) after replacing vector $c^n$ by the estimate $\hat{c}^n(m-1)$. Referring to FIG. 5B, the vector 566 $\hat{q}$ is inputted to the transfer matrix $\hat{Q}$ generator 570. The transfer matrix $\hat{Q}$ generator 570 computes the matrix 572 $\hat{Q}$ from (46)-(48) with the q replaced by the estimate 566 $\hat{q}$.

Referring to FIG. 5B, the matrix 572 $\hat{Q}$ is inputted to both the inputs of the conjugate multiplier 573 for providing the output 574 $\hat{Q}^H \hat{Q}$ to the adder 578. The adder adds the noise covariance matrix 546 $R_n$ to the input 574 $\hat{Q}^H \hat{Q}$ providing the output 580 $(\hat{Q}^H \hat{Q}+R_n)$ to the matrix inverse block 585. The matrix inverse block 585 computes the inverse of the input matrix 580 $(\hat{Q}^H \hat{Q}+R_n)$ providing the inverse matrix 586 $(\hat{Q}^H \hat{Q}+R_n)^{-1}$ to the matrix multiplier 588.

Referring to FIG. 5B, the matched filter block 560 output vector 561 z(m) is inputted to the conjugate multiplier 562. The conjugate multiplier 562 pre multiplies the vector 561 z(m) by the matrix $\hat{Q}^H$ providing the output 563 $\hat{Q}^H z(m)$ to the matrix multiplier 588. The matrix multiplier 588 pre multiplies the vector 563 $\hat{Q}^H z(m)$ by the matrix 586 $(\hat{Q}^H \hat{Q}+R_n)^{-1}$ providing the symbol vector estimate 590 $\hat{S}(m)$ given by (51) to the vector to scalar converter 595. Referring to FIG. 5B, the vector to scalar converter 595 provides the symbol estimates 350a through N-1 $\hat{s}_0(m), \hat{s}_1(m), \ldots \hat{s}_{N-1}(m)$ at the output of the symbol estimator 500B.

Figure 5C:
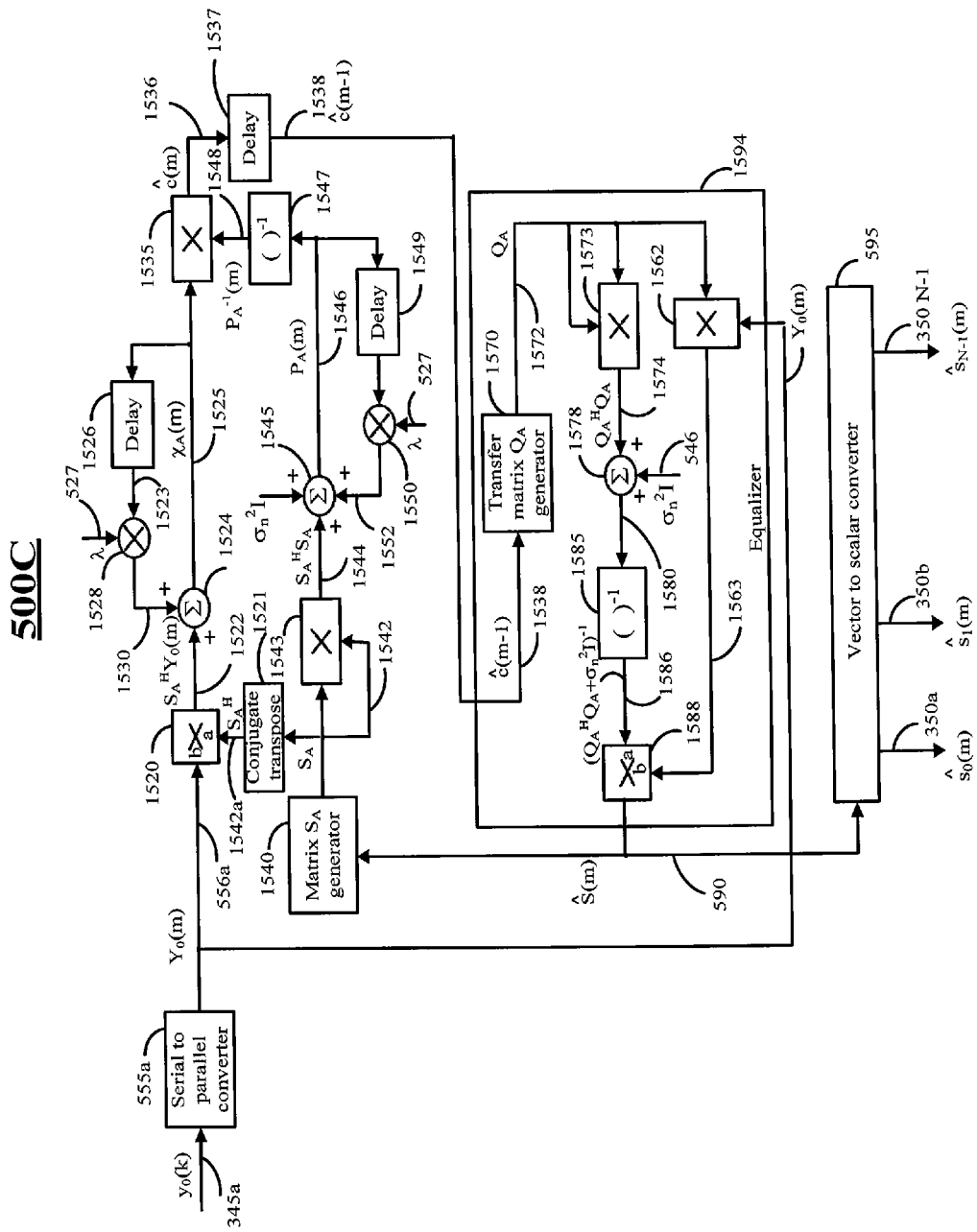
FIG. 5C shows a block diagram of one embodiment of symbol estimator.

FIG. 5C shows an embodiment of the symbol estimator 500C wherein the channel frequency response vector c is estimated from the signal 345a $y_0(k)$. Various other embodiments of the symbol estimator may be based on any of the signals 345n $y_n(k)$; n=1, 2, ..., N-1. Referring to FIG. 5C, the signal 345a $y_0(k)$ is inputted to the serial to parallel converter that provides the vector $Y_0(m)$ with elements equal to samples of $y_0(k)$ and given by (53). The vector $Y_0(n)$ may be expressed as $$Y_0(m)=\mathcal{B}(S_{0M} \odot \mathcal{A}^{-1})c+v^0(m) \quad (53)$$

In (53) $v^0(m)$ is the noise present at the output of the serial to parallel converter 555a with covariance matrix equal to $\sigma_n^2 I$.

In (53) the matrices $\mathcal{B}, \mathcal{A}$ are given by (47), and (39) respectively and $S_{0M}$ is the Toeplitz matrix given by (38). An exponentially data weighted least squares algorithm for the estimate ĉ(m) may be obtained from (53) and is given by.

$$P_A(m) = \lambda P_A(m-1) + S_A^H S_A + \sigma_n^2 I; \quad m=1,2,\ldots \quad (54)$$

$$S_A = \mathcal{B}(\hat{S}_{0M} \boxdot A^{-1}) \quad (55)$$

$$\chi_A(m) = \lambda \chi_A(m-1) + S_A^H Y_0(m); \quad m=1,2,\ldots \quad (56)$$

$$\hat{c}(m) = P_A^{-1}(m)\chi_A(m); \quad m=1,2,\ldots \quad (57)$$

where in (55) $\hat{S}_{0M}$ is the estimate of the Toeplitz matrix $S_{0M}$ given by (38).

Referring to FIG. 5C, the vector 556a $Y_0(m)$ is inputted to the matrix multiplier 1520. Referring to FIG. 5C, the symbol estimates vector 590 $\hat{S}(m)$ comprised of the symbol estimates $\hat{s}_n(m)$ as components with $\hat{S}(m) = [\hat{s}_0(m)\hat{s}_1(m)\ldots\hat{s}_{N-1}(m)]^T$, is inputted to the matrix $S_A$ generator 1540. The matrix $S_A$ generator 1540 evaluates the matrix 1542 $S_A$ according to (55) and provides the Hermitian transpose of the result 1542a $S_A^H$ to the matrix multiplier 1520. The matrix multiplier 1520 pre multiplies the vector 556a $Y_0(m)$ by the matrix 1542a $S_A^H$ providing the product 1522 $S_A^H Y_0(m)$ to the adder 1524.

Referring to FIG. 5C, the feedback loop comprised of the adder 1524, the delay 1526, and the $\lambda$-multiplier 1528 generates the vector 1525 $\chi_A(m)$ given by (56). Referring to FIG. 5C, the matrix 1542 $S_A$ is provided to both the inputs of the conjugate multiplier 1543 for providing the matrix product 1544 $S_A^H S_A$ to the adder 1545. Referring to FIG. 5B, the feedback loop comprised of the adder 1545, the delay 1549, and the $\lambda$-multiplier 1550 generate the matrix $P_A(m)$ given by (54).

Referring to FIG. 5C, the matrix $P_A(m)$ is inverted by the matrix inverter 1547 providing the inverse matrix 1548 $P_A^{-1}(m)$ to the conjugate multiplier 1535. Referring to FIG. 5C, the vector 1525 $\chi_A(m)$ is inputted to the conjugate multiplier 1535 and is pre multiplied by the matrix 1548 $P_A^{-1}(m)$ providing the estimate of the channel frequency response vector 1536 ĉ(m) at the output of conjugate multiplier 1535. The estimate 1536 ĉ(m) is delayed by the delay 1537 providing the delayed estimate 1538 ĉ(m−1) to the equalizer 1594.

In order to estimate the symbol vector S(m), (53) may be reorganized as $$Y_0(m) = (\mathcal{C} \boxdot A)S(m) + v^0(m) \quad (58)$$

In (58) $S(m) = [s_0(m)s_1(m)\ldots s_{N-1}(m)]^T$ is the symbol vector and $\mathcal{C}$ is the matrix given by $$\mathcal{C} = \begin{bmatrix} c_0 & c_{N-1} & c_{N-2} & \ldots & c_1 \\ c_1 & c_0 & c_{N-1} & \ldots & c_2 \\ \ldots & \ldots & \ldots & \ldots & \ldots \\ c_{N-1} & c_{N-2} & c_{N-3} & \ldots & c_0 \end{bmatrix} \quad (59)$$

From (58) the symbol vector S(m) may be estimated by (60).

$$\hat{S}(m) = [Q_A^H Q_A + \sigma_n^2 I]^{-1} Q_A^H Y_0(m); \quad Q_A = (\hat{\mathcal{C}} \boxdot A); \quad m=1,2,\ldots \quad (60)$$

In (60) $\hat{\mathcal{C}}$ is an estimate of the matrix $\mathcal{C}$ obtained by replacing the elements $c_n$ of $\mathcal{C}$ by their respective estimates $\hat{c}_n(m-1); n=0, 1, \ldots, N-1$ that are components of the vector 1538 ĉ(m−1) obtained in (57).

Referring to FIG. 5C, the estimate of the channel frequency response vector 1538 $\hat{c}_n(m-1)$ is inputted to the transfer matrix $Q_A$ generator 1570. The transfer matrix $Q_A$ generator 1570 computes the matrix 1572 $Q_A$ from (50)-(60).

Referring to FIG. 5C, the matrix 1572 $Q_A$ is inputted to both the inputs of the conjugate multiplier 1573 for providing the output 1574 $Q_A^H Q$ to the adder 1578. The adder adds the noise covariance matrix 1546 $\sigma_n^2 I$ to the input 1574 $Q_A^H Q$ providing the output 1580 ($Q_A^H Q + \sigma_n^2 I$) to the matrix inverse block 1585. The matrix inverse block 1585 computes the inverse of the input matrix 1580 ($Q_A^H Q + \sigma_n^2 I$) providing the inverse matrix 1586 ($Q_A^H Q + \sigma_n^2 I)^{-1}$ to the matrix multiplier 1588.

Referring to FIG. 5C, the vector 556a $Y_0(m)$ is inputted to the conjugate multiplier 1562. The conjugate multiplier 1562 pre multiplies the vector 556a $Y_0(m)$ by the matrix $Q_A^H$ providing the output 1563 $Q_A^H Y_0(m)$ to the matrix multiplier 1588. The matrix multiplier 1588 multiplies the vector 1563 $Q_A^H Y_0(m)$ by the matrix 1586 ($Q_A^H Q + \sigma_n^2 I)^{-1}$ providing the symbol vector estimate 590 $\hat{S}(m)$ given by (60) to the vector to scalar converter 595. Referring to FIG. 5C, the vector to scalar converter 595 provides the symbol estimates 350 a through N-1 $\hat{s}_0(m), \hat{s}_1(m), \ldots \hat{s}_{N-1}(m)$ at the output of the symbol estimator 500C.

Figure 6:
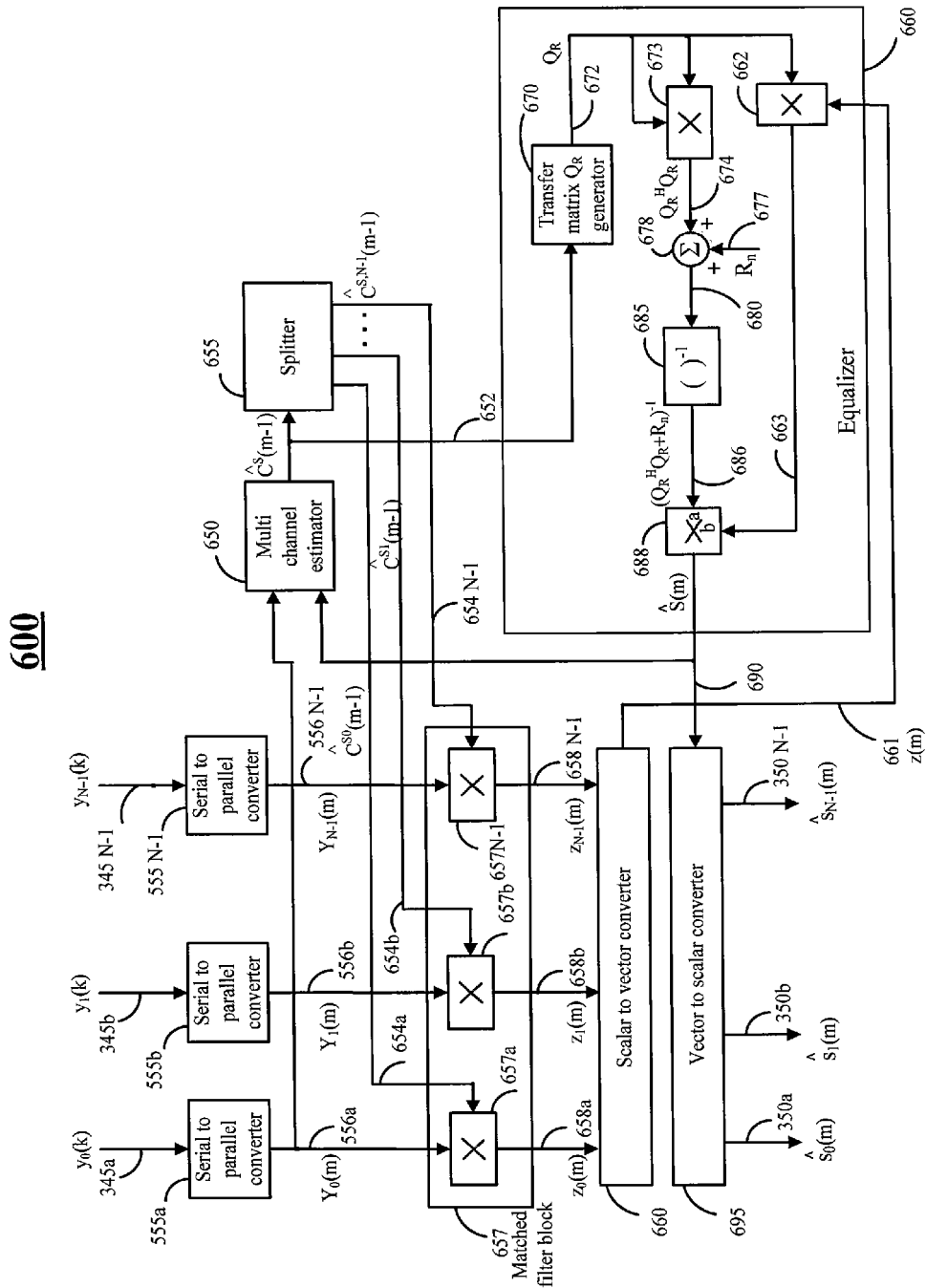
FIG. 6 shows a block diagram of one embodiment of symbol estimator.

FIG. 6 shows an embodiment of the symbol estimator 600. The embodiment shown in FIG. 6 may be for the case when the OFCM receiver 300 is located, for example, in the base station of a mobile communication network and receives signals transmitted from various user terminals traversing different communication paths experiencing possibly different frequency selective fading.

Referring to FIG. 6, the signals 345a,b, ..., N-1 $y_0(k), \ldots, y_{N-1}(k)$ are inputted to the serial to parallel converters 555a,b, ..., N-1. The serial to parallel converter 555n; n=0, 1, ..., N-1 collates the N samples of signal 345n $y_n(k)$ in any OFCM symbol period into the vector 556n $Y_n(m)$ with $$Y_n(m) = [y_n(k_0)y_n(k_0+1)\ldots y_n(k_0+N-1)]^T; k_0 = ((m-1)N-1); m=1,2,\ldots \quad (33)$$

Referring to FIG. 6, the vector 556a $Y_0(m)$ is inputted to the multichannel estimator block 650. In various embodiments of the invention, any one of the N vectors 556n $Y_n(m)$ may be selected as input to the multichannel estimator block 650.

The multichannel estimator 650 provides the estimate of the communication channel n frequency response vector $C_n^M = [c_{n,0} c_{n,1} \ldots c_{n,N-1}]^T; n=0, 1, \ldots, N-1$. The $i^{th}$ component $Y_{0,i}(m)$ of the vector 556a $Y_0(m)$ may be expressed in terms of the information baseband symbol vector S(m) by (61).

$$Y_{0,i}(m) = S^T(m)(A_i \boxdot C_i^{ST}) + v_i^0(m); i=0, 1, \ldots, N-1 \quad (61)$$

In (61) $A_i$ denotes the $i^{th}$ column of the matrix $A$ in (39), $v_i^0(m)$ is the noise, and $C_i^{ST}$ denotes the transpose of the first row of the matrix $C^S$ with the matrix $C^S$ given by $$C^S = \begin{bmatrix} c_{0,0} & c_{1,N-1} & c_{2,N-2} & \ldots & c_{N-1,1} \\ c_{0,1} & c_{1,0} & c_{2,N-1} & \ldots & c_{N-1,2} \\ \ldots & \ldots & \ldots & \ldots & \ldots \\ c_{0,N-1} & c_{1,N-2} & c_{2,N-3} & \ldots & c_{N-1,0} \end{bmatrix} \quad (62)$$

The $i^{th}$ column $C^{Si}$ of the matrix $C^S$ is equal to i times circularly shifted version of $i^{th}$ channel frequency response vector $C_i^M$; i=0,1, ..., N-1. For example, $C^{S1} = [c_{1,N-1}, c_{1,0}, \ldots, c_{1,N-2}]^T$.

An exponentially data weighted Kalman filter algorithm for the estimation of the $i^{th}$ column $C_i^A$ of the matrix $(A_i \square C_i^{ST})$ may be obtained from (61) with $S(m)$ replaced by the estimate $\hat{S}(m)$ and is given by (63).

$$R(m)=\lambda^{-1}[R(m-1)-R(m-1)\hat{S}(m)(\hat{S}^H(m)R(m-1)\hat{S}(m)+\lambda\sigma_n^2)^{-1}\hat{S}^H(m)R(m-1)] \quad (63a)$$

$$K(m)=R(m-1)\hat{S}(m)(\hat{S}^H(m)R(m-1)\hat{S}(m)+\lambda\sigma_n^2)^{-1} \quad (63b)$$

$$\hat{C}_i^A(m)=\hat{C}_i^A(m-1)+K(m)[Y_{0,i}(m)-\hat{C}_i^A(m-1)\hat{S}(m)]^*;$$
$$i=0,1,\ldots,N-1 \quad (63c)$$

In (62) $\lambda$ is the exponentially data weighting factor, $K(m)$ is the Kalman filter gain, * denotes complex conjugate, $\hat{C}_i^A(m)$ denotes the estimate of $C_i^A$ at time m, and the initialization matrix $R(0)$ may be selected to be equal to $\epsilon I$ for some small positive scalar $\epsilon$ with I denoting the identity matrix. The estimate of $C^A = C^{ST} \square A$ with $C^S$ defined by (63) may be obtained by collating the estimates in (62c) for $i = 0, 1, \ldots, N-1$ in the form of a matrix and is given by (64).

$$\hat{C}^A(m)=\hat{C}_i^A(m-1)+K(m)[Y_0(m)-\hat{C}^{AT}(m-1)\hat{S}(m)]^H;$$
$$m=0,1,\ldots \quad (64)$$

The estimate of $C^{ST}$ may be obtained by (65) wherein the matrix $A_I$ is obtained by replacing a by $a^{-1}$ in (39).

$$\hat{C}^{ST}(m)=\hat{C}^A(m) \square A_I; m=0,1,\ldots \quad (65)$$

Figure 6A:
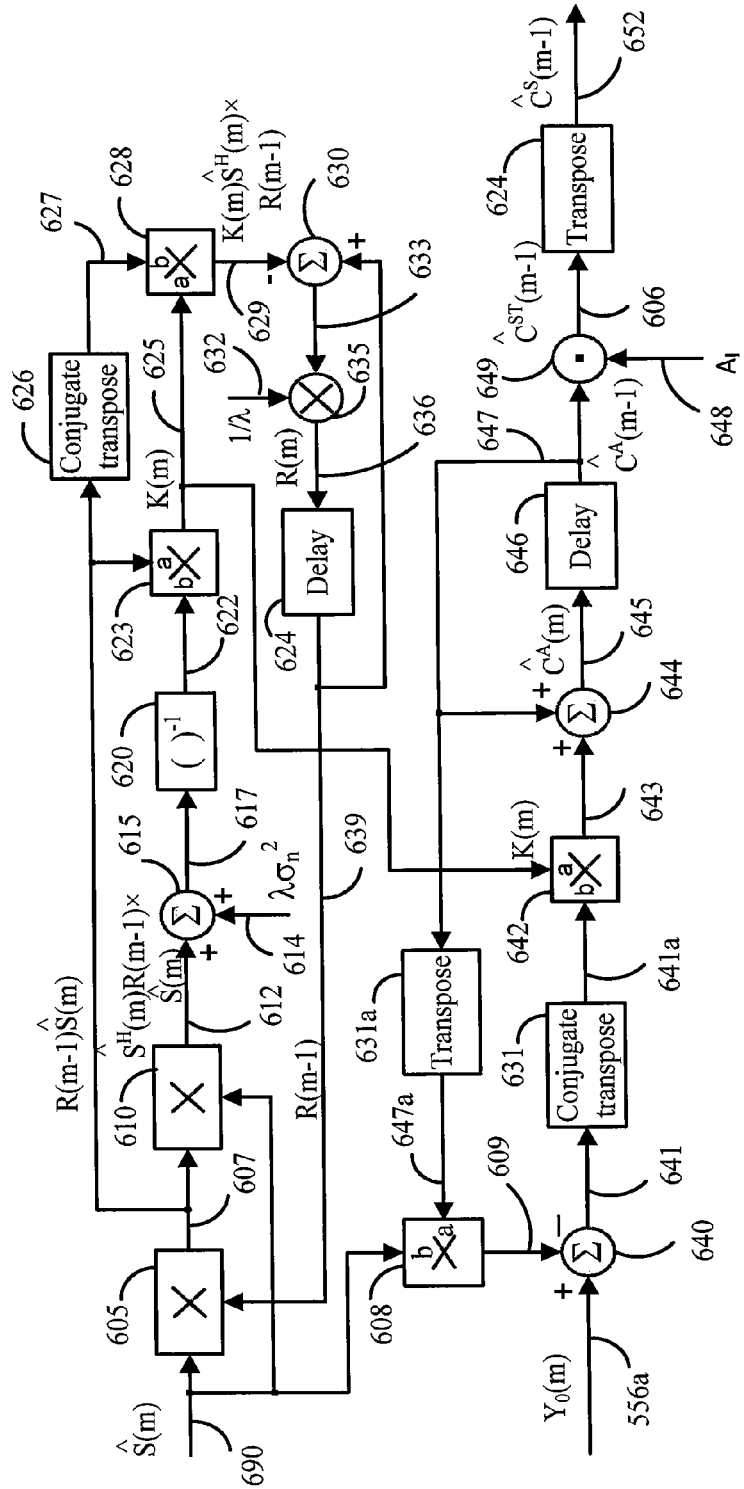
FIG. 6A shows a block diagram of one embodiment of multichannel estimator.

FIG. 6A shows the block diagram of the multichannel estimator 650. Referring to FIG. 6A, the estimate of the information baseband symbol vector 690 $\hat{S}(m)$ is inputted to the conjugate multiplier 605 and is pre multiplied by the matrix 639 $R(m-1)$ provided by the delay 624. Referring to FIG. 6A, the product 607 $R(m-1)\hat{S}(m)$ is inputted to the conjugate multiplier 610 and is pre multiplied by $\hat{S}^H(m)$ providing the result 612 $(\hat{S}^H(m)R(m-1)\hat{S}(m))$ to the adder 615. The adder 615 adds $\lambda$ times the noise variance 614 $\lambda\sigma_n^2$ to the input 612 providing the result 617 $(\hat{S}^H(m)R(m-1)\hat{S}(m)+\lambda\sigma_n^2)$ to the inverse block 620 for providing the inverse 622 $(\hat{S}^H(m)R(m-1)\hat{S}(m)+\lambda\sigma_n^2)^{-1}$ to the matrix multiplier 623.

Referring to FIG. 6A, the matrix multiplier 623 pre multiplies the input 622 by the vector 607 $R(m-1)\hat{S}(m)$ providing the Kalman gain 625 $K(m)$ given by (63b) to the matrix multiplier 628. The matrix multiplier 628 post multiplies the Kalman gain 625 $K(m)$ by the matrix 627 $\hat{S}^H(m)R(m-1)$ inputted by the conjugate transpose block 626. The conjugate transpose block 626 is inputted by the vector 607.

Referring to FIG. 6A, the product 629 $K(m)\hat{S}^H(m)R(m-1)$ is subtracted from 639 $R(m-1)$, provided by the delay 624, by the adder 630. The output 633 of the adder 630 is multiplied by the factor 632 $1/\lambda$ by the multiplier 635 providing the matrix 636 $R(m)$ according to (63a). The matrix 636 $R(m)$ is delayed by the delay 624 providing the delayed matrix 639 $R(m-1)$ to the conjugate multiplier 605. Referring to FIG. 6A, the Kalman gain 625 $K(m)$ is provided to the matrix multiplier 642.

Referring to FIG. 6A, the estimate of the information baseband symbol vector 690 $\hat{S}(m)$ is inputted to the matrix multiplier 608 for pre multiplication by the matrix 647a $\hat{C}^{AT}(m-1)$ provided by the transpose block 631a. The transpose block 631a is inputted with the matrix 647 $\hat{C}^A(m-1)$. The output 609 $\hat{C}^{AT}(m-1)\hat{S}(m)$ is made available to the adder 640. Referring to FIG. 6A, the signal vector 556a $Y_0(m)$ is inputted to the adder 640 for providing the difference 641 $[Y_0(m)-\hat{C}^{AT}(m-1)\hat{S}(m)]$ to the conjugate transpose block 631. The output of the conjugate transpose block 631 is provided to the matrix multiplier 642. The matrix multiplier 642 pre multiplies the conjugate transpose of the difference 641 by the Kalman gain $K(m)$ 625 providing the correction term 643 at the output of the matrix multiplier 642 to the adder 644.

Referring to FIG. 6A, the estimate 647 $\hat{C}^A(m-1)$ is inputted to the adder 644 for providing the updated estimate 645 $\hat{C}^A(m)$ according to (64). The updated estimate 645 $\hat{C}^A(m)$ is delayed by the delay 646 providing the estimate 647 $\hat{C}^A(m-1)$ to the component wise matrix multiplier 649.

Referring to FIG. 6A, the matrix 648 $A_I$ is inputted to the component wise matrix multiplier 649 for providing the estimate 606 $\hat{C}^{ST}(m-1)$ according to (65). The estimate 606 $\hat{C}^{ST(m-1)}$ is transposed by 634 providing the channel matrix 652 $\hat{C}^S(m-1)$ at the output of the multichannel estimator 650.

Referring to FIG. 6, the channel matrix 652 $\hat{C}^S(m-1)$ provided by the multichannel estimator 650 is inputted to the splitter 655. The splitter separates the columns of the matrix 652 $\hat{C}^S(m-1)$ providing 654 a through N-1 $\hat{C}^{S0}(m-1)\hat{C}^{S1}(m-1),\ldots,\hat{C}^{S,N-1}(m-1)$ wherein the $i^{th}$ column 654i $\hat{C}^{Si}(m-1)$ of the channel matrix 652 $\hat{C}^S(m-1)$ is the estimate of the i times circularly shifted version of $i^{th}$ channel frequency response vector $C_i^M$ for $i=0, 1, \ldots, N-1$.

Referring to FIG. 6, the channel estimates 654n $\hat{C}^{Sn}(m-1)$ is inputted to the matched filter block 657. Referring to FIG. 6, the matched filter 657n provides the output 658n $z_n(m)$ given by $$z_n(m)=[\hat{c}^{Sn}(m-1)]^H Y_n(m); n=0,1,\ldots N-1; m=1,2,\ldots \quad (66)$$

Referring to FIG. 6, the matched filter outputs 658n $z_n(m)$; $n=0, 1, \ldots, N-1$ are inputted to the scalar to vector converter 660 for providing the vector 661 $z(m)$ comprised of the components $z_n(m)$ to the equalizer 660.

Referring to FIG. 6, the channel matrix 652 $\hat{C}^S(m-1)$ provided by the multichannel estimator 650 is inputted to the transfer matrix $Q_R$ generator 670. The transfer matrix $Q_R$ generator 670 generates the N×N matrix $Q_R$ with the $(k,n)^{th}$ element of the matrix given by $$Q_R(k,n)=[\hat{C}^{Sk}(m-1)]^H[\hat{C}^{Sn}(m-1) \square A_{5,l}]; l=(n-k)\bmod N;$$
$$k,n=0,1,\ldots,N-1 \quad (67)$$

The result of the modulo N operation in (67) lies in the range of 0 to N-1, and $A_n$ is the $n^{th}$ column of the matrix $A$ given by (39); $n=0, 1, \ldots, N-1$.

Referring to FIG. 6, the matched filter output vector 661 $z(m)$ may be expressed as in (68).

$$z(m)=Q_R^a S(m)+v(m); m=1,2,\ldots \quad (68)$$

In (68) $Q_R^a$ is the matrix obtained from $Q_R$ with the estimate $\hat{C}^{Sn}(m-1)$ replaced by the shifted channel frequency response vector $C^{Sn}$; $n=0, 1, \ldots, N-1$, $S(m)$ is the symbol vector $S(m)=[s_0(m)s_1(m)\ldots s_{N-1}(m)]^T$, and $v(m)$ is the noise present at the output of the matched filter block 657.

The symbol vector $S(m)$ may be estimated from (68) as $$\hat{S}(m)=[Q_R^H Q+R_n]^{-1}Q_R^H z(m); m=1,2,\ldots \quad (69)$$

In (69) the matrix $Q_R$ is the estimate of the matrix $Q_R^a$ given by (67), and covariance matrix $R_n$ of the noise vector $v(m)$ may be estimated by a diagonal matrix with the $l^{th}$ diagonal element $R_n(l,l)$ given by (70).

$$R_n(l,l)=\|\hat{C}^{Sl}(m-1)\|^2\sigma_n^2; l=0,1,\ldots,N-1 \quad (70)$$

Referring to FIG. 6, the matrix 672 $Q_R$ is inputted to both the inputs of the conjugate multiplier 673 for providing the output 674 $Q_R^H Q_R$ to the adder 678. The adder adds the noise covariance matrix 677 $R_n$ to the input 674 $Q_R^H Q_R$ providing the output 680 $(Q_R^H Q_R+R_n)$ to the matrix inverse block 685. The inverse block 685 computes the inverse of the input matrix 680 $(Q_R^H Q_R+R_n)$ providing the inverse matrix 686 $(Q_R^H Q_R+R_n)^{-1}$ to the matrix multiplier 688.

Referring to FIG. 6, the scalar to vector converter 660 output vector 661 $z(m)$ is inputted to the conjugate multiplier 662. The conjugate multiplier 662 pre multiplies the vector

661 z(m) by the matrix 672 $Q_R^H$ providing the output 663 $Q_R^H z(m)$ to the matrix multiplier 688. The matrix multiplier 688 pre multiplies the vector 663 $Q_R^H z(m)$ by the matrix 686 $(Q_R^H Q_R + R_n)^{-1}$ providing the symbol vector estimate 690 $\hat{S}(m)$ given by (69) to the vector to scalar converter 695. Referring to FIG. 6, the vector to scalar converter 695 provides the symbol estimates 350 a through N-1 $\hat{s}_0(m)$, $\hat{s}_1(m), \ldots \hat{s}_{N-1}(m)$ at the output of the symbol estimator 600.

Various modifications and other embodiments of the invention applicable to various problems in Communication and other fields will be readily apparent to those skilled in the art in the field of invention. For example, the frequency chirp waveform may be selected to be different than the saw tooth waveform in various embodiments of the invention. In various embodiments of the invention, the multiplicity N information baseband symbol periods may be possibly distinct integer multiples of the period of the frequency chirp waveforms. The orthogonal frequency chirp multiple accessing architectures of the invention can be readily modified and applied to various fields where such an architecture is applicable. Examples of such fields include Radars, sonar, digital audio systems and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent that the embodiments described herein may be implemented in many different embodiments of software, firmware, and/or hardware, for example, based on Field Programmable Gate Array (FPGA) chips or implemented in Application-Specific Integrated Circuits (ASICS). The software and firmware code may be executed by a computer or computing device comprising a processor (e.g., a DSP or any other similar processing circuit) including, for example, the computing device described below. The processor may be in communication with memory or another computer-readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated with a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 7:
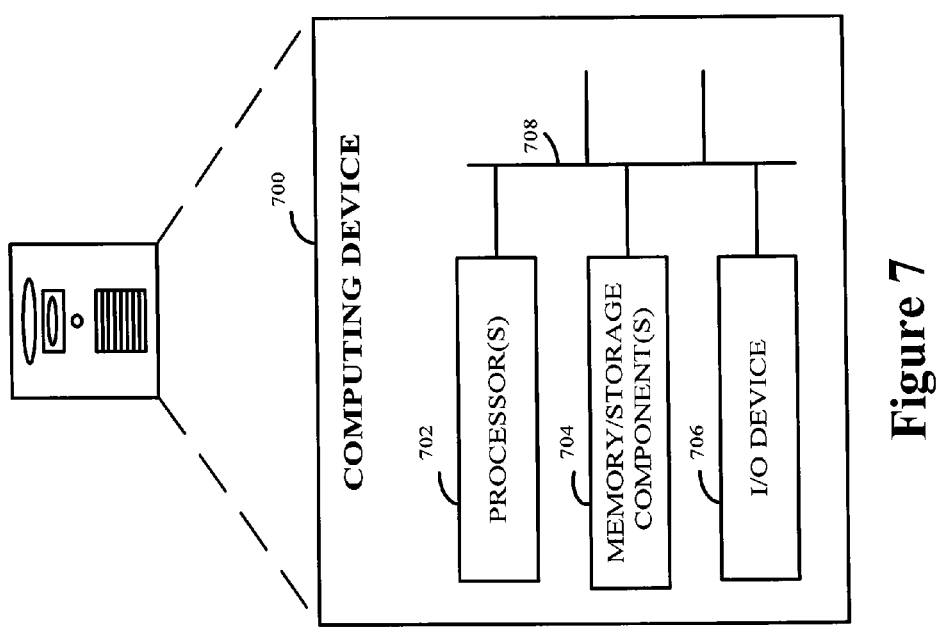
FIG. 7 shows one embodiment of an example computer device.

FIG. 7 shows an example of a computing device 700 according to one embodiment. For the sake of clarity, the computing device 700 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 7, the computing device 700 comprises one or more processor circuits or processing units 702, one or more memory and/or storage circuit component(s) 704 and one or more input/output (I/O) devices 706. Additionally, the computing device 700 comprises a bus 708 that allows the various circuit components and devices to communicate with one another. The bus 708 represents one or more of any of several types of bus structures, including a memory bus or memory controller, a peripheral bus, an accelerated graphics port, and a processor or local bus using any of a variety of bus architectures. The bus 708 may comprise wired and/or wireless buses.

The processing unit 702 may be responsible for executing various software programs such as system programs, application programs, and/or program modules/blocks to provide computing and processing operations for the computing device 700. The processing unit 702 may be responsible for performing various voice and data communications operations for the computing device 700 such as transmitting and receiving voice and data information over one or more wired or wireless communications channels. Although the processing unit 702 of the computing device 700 is shown in the context of a single processor architecture, it may be appreciated that the computing device 700 may use any suitable processor architecture and/or any suitable number of processors in accordance with the described embodiments. In one embodiment, the processing unit 702 may be implemented using a single integrated processor. The processing unit 702 may be implemented as a host central processing unit (CPU) using any suitable processor circuit or logic device (circuit), such as a general purpose processor. The processing unit 702 also may be implemented as a chip multiprocessor (CMP), dedicated processor, embedded processor, media processor, input/output (I/O) processor, co-processor, microprocessor, controller, microcontroller, application-specific integrated circuit (ASIC), field programmable gate array (FPGA), programmable logic device (PLD), or other processing device in accordance with the described embodiments.

As shown, the processing unit 702 may be coupled to the memory and/or storage component(s) 704 through the bus 708. The bus 708 may comprise any suitable interface and/or bus architecture for allowing the processing unit 702 to access the memory and/or storage component(s) 704. Although the memory and/or storage component(s) 704 may be shown as being separate from the processing unit 702 for purposes of illustration, it is worthy to note that in various embodiments some portion or the entire memory and/or storage component(s) 704 may be included on the same integrated circuit as the processing unit 702. Alternatively, some portion or the entire memory and/or storage component(s) 704 may be disposed on an integrated circuit or other medium (e.g., hard disk drive) external to the integrated circuit of the processing unit 702. In various embodiments, the computing device 700 may comprise an expansion slot to support a multimedia and/or memory card, for example.

The memory and/or storage component(s) 704 represent one or more computer-readable media. The memory and/or storage component(s) 704 may be implemented using any computer-readable media capable of storing data such as volatile or non-volatile memory, removable or non-removable memory, erasable or non-erasable memory, writeable or re-writeable memory, and so forth. The memory and/or storage component(s) 704 may comprise volatile media (e.g., random access memory (RAM)) and/or non-volatile media (e.g., read only memory (ROM), Flash memory, optical disks, magnetic disks and the like). The memory and/or storage component(s) 704 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 706 allow a user to enter commands and information to the computing device 700, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADCs, DACs, a display device (e.g., a monitor or projector, speakers, a printer, a network card). The computing device 700 may comprise an alphanumeric keypad coupled to the processing unit 702. The keypad may comprise, for example, a QWERTY key layout and an integrated number dial pad. The computing device 700 may comprise a display coupled to the processing unit 702. The display may comprise any suitable visual interface for displaying content to a user of the computing device 700. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 702 may be arranged to provide processing or computing resources to the computing device 700. For example, the processing unit 702 may be responsible for executing various software programs including system programs such as operating system (OS) and application programs. System programs generally may assist in the running of the computing device 700 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 700 may comprise other system programs such as device drivers, programming tools, utility programs, software libraries, application programming interfaces (APIs), and so forth.

In various embodiments disclosed herein, a single component may be replaced by multiple components, and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

I claim:

1. An OFCM (Orthogonal Frequency Chirp Multiple accessing) transmitter system comprised of:
    a baseband modulation subsystem for receiving and modulating a plurality of input data signals providing a multiplicity $N_u$, in general complex valued, information baseband symbols;
    a subsystem for generating multiplicity $N_T$ frequency chirp waveforms;
    a bank of multiplicity $N_T$ spread spectrum modulators modulating the frequency chirp waveforms by the information baseband symbols for providing multiplicity $N_T$ spread spectrum signals; and
    an adder summing the spread spectrum signals for providing a serial OCFM signal comprised of a plurality of consecutive OCFM symbols.

2. System of claim 1 further comprised of:
    a guard interval insertion unit for cyclically extending the OCFM symbol duration by a guard interval providing a baseband OCFM signal;

a baseband to IF converter modulating the baseband OCFM signal by an IF local oscillator in phase and quadrature signals for providing an IF band pass OCFM signal;

an RF stages unit comprised of an up converter, an RF band pass filter and power amplifier for providing the RF band pass OCFM signal.

3. System of claim 1 wherein the multiplicity $N_T$ frequency chirp waveforms are discrete time orthogonal waveforms.

4. System of claim 1 wherein the baseband modulation subsystem is comprised of multiplicity $N_u$ baseband modulators configured to modulate the respective input data signal according to at least one technique selected from the group comprised of a Multiple Quadrature Amplitude Modulation (MQAM) technique and a Multiple Phase Shift Keying Modulation (MPSK) technique.

5. An OCFM receiver comprised of:
a receive antenna for receiving a radio frequency (RF) band pass OCFM signal;
an RF front stage unit comprised of an RF filter, amplifier and down converter for providing an Intermediate Frequency (IF) band pass OCFM signal;
a carrier phase tracking loop;
a cascade of an IF to complex baseband converter, an analog to digital converter, and a guard interval deletion unit for providing an estimated serial OFCM signal;
a frequency chirp waveform generator for providing a multiplicity $N_R$ complex conjugates frequency chirp waveforms;
a bank of multiplicity $N_R$ spread spectrum demodulators;
a symbol estimator for providing linear estimates of the information baseband symbols;
a bank of multiplicity $N_u$ decision devices for detection of the information baseband symbols; and
a baseband demodulation subsystem for providing estimated input data signals.

6. Receiver of claim 5 further comprised of:
a symbol timing estimator; and
a frequency offset estimator.

7. Receiver of claim 5 wherein the carrier phase tracking loop is comprised of:
a bank of multiplicity $N_c$ phase detector units for providing a plurality $N_c$ of estimated carrier phase errors, wherein $N_c$ is an integer from the range of integers 1 to $N_R$;
a cascade of a phase error averaging unit, a gain block and a loop filter for providing a phase correction signal;
an NCO (numerically controlled oscillator) for providing an in phase and a quadrature phase corrected IF local oscillator signals.

8. Receiver of claim 5 wherein the carrier phase tracking loop is comprised of:
a phase corrector for phase error correction of the linear estimates of the information baseband symbols by an estimated carrier phase error and for providing phase error corrected information baseband symbols;
a decision device for the detection of the information baseband symbols;
a cascade of a phase error detector, a gain block, and a loop filter for providing the estimated carrier phase error;
a complex exponential function unit for providing a correction signal to the phase corrector.

9. Receiver of claim 5 wherein the symbol estimator unit is comprised of a bank of multiplicity $N_R$ integrate and dump matched filters.

10. Receiver of claim 5 wherein the symbol estimator unit is comprised of a matched filter block, a channel estimator, an equalizer, and a vector to serial converter.

11. System of claim 10 wherein the channel estimator unit provides an estimated channel frequency response vector based on an exponentially data weighted least squares algorithm and is further comprised of:
a first loop comprised of an adder, a delay, and a λ-multiplier for generating a vector χ;
a matrix $S_M$ generator for providing a matrix $S_M$ with elements derived from linear estimates of the information baseband symbols provided by the symbol estimator;
a second loop for accumulating the matrix $(S_M S_M^H)$, H denotes Hermitian transpose, with exponential data weighting for providing a matrix P; and
a matrix inverter and a matrix multiplier for computing an estimated channel frequency response vector from the matrix P and the vector χ.

12. System of claim 10 wherein the equalizer is comprised of:
a transfer matrix Q generator for generating a matrix Q with elements derived from the elements of the estimated channel frequency response vector provided by the channel estimator and the elements of a Fourier transform matrix; and
a least squares estimator for providing the linear estimate of the symbol vector.

13. Receiver of claim 5 wherein the symbol estimator unit is comprised of a matched filter block, an equalizer; a vector to serial converter; a multichannel channel estimator for providing a channel matrix C with columns composed of the estimated channel frequency response vectors of multiplicity $N_R$ channels; and a splitter for providing the estimated channel frequency response vectors to the matched filter block.

14. System of claim 13 wherein the multichannel channel estimator is comprised of an exponentially data weighted Kalman filter.

15. A method for the OFCM transmission and reception of a plurality of input data signals, the transmission method comprising:
implementing, by a computer device, a baseband modulation subsystem for receiving and modulating the input data providing a multiplicity $N_u$, in general complex valued, information baseband symbols;
implementing, by the computer device, a subsystem for generating multiplicity $N_R$ frequency chirp waveforms;
implementing, by the computer device, a bank of multiplicity $N_R$ spread spectrum modulators modulating the frequency chirp waveforms by the information baseband symbols for providing multiplicity $N_m$ spread spectrum signals;
implementing, by the computer device, an adder summing the spread spectrum signals for providing a serial OCFM signal comprised of the consecutive OCFM symbols; and
implementing, by the computer device, a guard interval insertion unit for cyclically extending the consecutive OCFM symbols by guard intervals providing a baseband OCFM signal.

16. The OFCM transmission method of claim 15 further comprised of:
implementing, by the computer device, an IF local oscillator for providing an in phase and a quadrature IF local oscillator signals;
implementing, by the computer device, a baseband to IF converter modulating the baseband OFCM signal by the in phase and quadrature IF local oscillator signals for providing an IF band pass OCFM signal;

implementing of an RF stages unit comprised of an up converter, an RF band pass filter and power amplifier for providing a radio frequency (RF) band pass OCFM signal; and transmission by a transmit antenna.

17. The method of claim 15, wherein the reception method is comprised of:

Receiving a radio frequency (RF) band pass OCFM signal by a receive antenna;

Filtering, amplifying and down conversion of the RF band pass OCFM signal for providing an IF band pass OCFM signal by an RF front stage unit;

implementing by, the computer device, a carrier phase tracking loop;

implementing by, the computer device, a cascade of an IF to complex baseband converter, an analog to digital converter, and a guard interval deletion unit for providing the serial OFCM signal;

implementing by, the computer device, the generation of the complex conjugates of the multiplicity $N_m$ frequency chirp waveforms;

implementing by, the computer device, a bank of multiplicity $N_m$ spread spectrum demodulators;

implementing by, the computer device, a symbol estimator for providing linear estimates of the information baseband symbols;

implementing by, the computer device, a bank of multiplicity N decision devices for the detection of the information baseband symbols; and implementing by, the computer device, a baseband demodulation subsystem for providing the estimates of the plurality of the input data signals.

18. Method of claim 17 further comprised of implementing, by the computer device, a symbol timing estimator; and a frequency offset estimator.

19. Method of claim 17 wherein implementing the symbol estimator is comprised of implementing, by the computer device, a matched filter block, an equalizer; a vector to serial converter; a multichannel estimator for providing a channel matrix C with columns composed of the estimated channel frequency response vectors of multiplicity $N_R$ channels; and a splitter for providing the estimated channel frequency response vectors to the matched filter block.

20. Method of claim 19 wherein implementing the multichannel estimator is comprised of implementing, by the computer device, an exponentially data weighted Kalman filter.

21. Method of claim 17 wherein implementing the carrier phase tracking loop is comprised of implementing, by the computer device, a phase corrector for phase error correction of the linear estimates of the information baseband symbols provided by the symbol estimator by an estimated carrier phase error and for providing the phase error corrected information baseband symbols;

a decision device for the detection of the information baseband symbols;

a cascade of a phase error detector, a gain block, and a loop filter for providing the estimated carrier phase error;

a complex exponential function unit for providing a correction signal to the phase corrector.

\* \* \* \* \*